(12) United States Patent
Watanabe

(10) Patent No.: US 9,086,084 B2
(45) Date of Patent: Jul. 21, 2015

(54) CLIP

(75) Inventor: Yasuhiro Watanabe, Toyota (JP)

(73) Assignee: Nifco Inc., Yokohama-shi, Kanagawa (JP)

( * ) Notice: Subject to any disclaimer, the term of this patent is extended or adjusted under 35 U.S.C. 154(b) by 0 days.

(21) Appl. No.: 13/811,797

(22) PCT Filed: Jul. 20, 2011

(86) PCT No.: PCT/JP2011/066484
§ 371 (c)(1),
(2), (4) Date: Feb. 20, 2013

(87) PCT Pub. No.: WO2012/014755
PCT Pub. Date: Feb. 2, 2012

(65) Prior Publication Data
US 2013/0145585 A1 Jun. 13, 2013

(30) Foreign Application Priority Data

Jul. 27, 2010 (JP) .................................. 2010-168562

(51) Int. Cl.
*F16B 19/00* (2006.01)
*F16B 19/10* (2006.01)

(52) U.S. Cl.
CPC ............. *F16B 19/008* (2013.01); *F16B 19/002* (2013.01); *F16B 19/1081* (2013.01); *Y10T 24/45262* (2015.01)

(58) Field of Classification Search
CPC .. F16B 19/002; F16B 19/008; F16B 19/1081; F16B 5/0642; Y10T 24/309; Y10T 24/42; Y10T 24/45262; B62D 27/02; Y10S 411/908
USPC .......................... 24/297, 453; 411/45, 48, 360
See application file for complete search history.

(56) References Cited

U.S. PATENT DOCUMENTS 6,514,024 B2 * 2/2003 Akema et al. .................... 411/48
6,769,849 B2 * 8/2004 Yoneoka ......................... 411/45
(Continued)

FOREIGN PATENT DOCUMENTS

CN        1730953 A     2/2006
JP     68505/1988 U     5/1988
(Continued)

OTHER PUBLICATIONS

PCT, "International Search Report for PCT/JP2011/066484", Oct. 25, 2011.
China Patent Office, "Office Action for CN 201180036471.2," Mar. 28, 2014.
Japan Patent Office, "Office Action for JP 2012-283738," Jul. 8, 2014.

*Primary Examiner* — Robert J Sandy
*Assistant Examiner* — David Upchurch
(74) *Attorney, Agent, or Firm* — Manabu Kanesaka

(57) ABSTRACT

A clip includes a pin; and a grommet including an insertion hole where the pin can be inserted, and forming a plurality of leg pieces by a slit provided in a length direction of a leg portion. In the clip, the grommet can spread portions by inserting the pin into the insertion hole. A prevention portion, which prevents a foreign matter such as gravel and the like from entering in, is provided at least in either one of the pin or the grommet (for example, the pin). The prevention portion may be positioned in one portion of an insertion leg of the pin, or positioned in one portion of the leg piece of the grommet, or provided to extend along a length direction of the slit from a lower surface of a flange of the grommet.

18 Claims, 21 Drawing Sheets

(56) References Cited

U.S. PATENT DOCUMENTS

| | | |
|---|---|---|
| 6,979,162 B2* | 12/2005 | Kato .................... 411/371.1 |
| 7,222,398 B2* | 5/2007 | Koike ........................ 24/297 |
| 2002/0001513 A1* | 1/2002 | Tanaka ........................ 411/45 |
| 2002/0026693 A1* | 3/2002 | Akema et al. ............... 24/453 |
| 2003/0143053 A1* | 7/2003 | Kanie ........................ 411/45 |
| 2004/0020016 A1* | 2/2004 | Yoneoka ..................... 24/297 |
| 2005/0091802 A1* | 5/2005 | Koike ........................ 24/297 |
| 2011/0170982 A1* | 7/2011 | Watanabe ................... 411/360 |

FOREIGN PATENT DOCUMENTS

| | | |
|---|---|---|
| JP | H04-138117 U | 12/1992 |
| JP | 2002-349526 A | 12/2002 |
| JP | 2006-105359 A | 4/2006 |
| JP | 2010-7687 A | 1/2010 |
| JP | 2010-019388 A | 1/2010 |
| JP | 2010-151223 A | 7/2010 |

* cited by examiner

CLIP

RELATED APPLICATIONS

The present application is National Phase of International Application No. PCT/JP2011/066484 filed Jul. 20, 2011, and claims priority from Japanese Application No. 2010-168562 filed Jul. 27, 2010.

FIELD OF TECHNOLOGY

The present invention relates to a clip which especially can prevent a foreign matter such as gravel and the like from entering into an insertion hole of a grommet wherein a pin is inserted.

BACKGROUND ART

Conventionally, there is well-known a clip comprising a pin, and a grommet including an insertion hole wherein the pin can be inserted, and forming a plurality of leg pieces by a slit provided in a length direction of a leg portion, and by an insertion of the pin into the insertion hole, the grommet can spread one portion (for example, see paragraph [0008] and FIGS. 1 to 6 in Patent Document 1, and paragraph [0015] and FIGS. 1 to 4 in Patent Document 2).

PRIOR ART DOCUMENTS

Patent Documents

Patent Document 1: Japanese Unexamined Patent Publication No. 2006-105359
Patent Document 2: Japanese Unexamined Patent Publication No. 2010-7687

SUMMARY OF THE INVENTION

Problems to be Solved by the Invention

In the aforementioned conventional clip, however, for example, in a case used for fastening a bumper and the like of an automobile, there has been a possibility that gravel, mud, and the like from an outside might enter between the pin and the grommet.

Consequently, in the conventional clip, there has been a problem that if gravel, mud, and the like enter in, releasing a fastened state would become difficult.

Namely, since a foreign matter such as gravel and the like enters between the pin and the grommet, a friction resistance between both portions increases, or a foreign matter such as a gravel and the like acts as a kind of a "wedge", so that there has been a possibility that the pin might be incapable of being pulled out.

Hence, the present invention is made in view of the problems the aforementioned conventional technology has, and an object thereof is to be capable of preventing a foreign matter such as gravel and the like from entering into the insertion hole of the grommet where the pin is inserted, by providing a prevention portion, which prevents foreign matter such as gravel and the like from entering in, at least in either one of the pin or the grommet.

Means for Solving the Problems

The present invention is made in order to achieve the aforementioned object, and has the following characteristics.

First, the present invention comprises a pin, and a grommet including an insertion hole wherein the pin can be inserted, and forming a plurality of leg pieces by a slit provided in a length direction of a leg portion.

Secondly, the present invention is a clip wherein the grommet can spread one portion by inserting the pin into the insertion hole.

Thirdly, at least in either one of the pin or the grommet (for example, the pin), there is provided a prevention portion which prevents a foreign matter such as gravel and the like from entering in.

Incidentally, although the prevention portion is provided in the pin, the prevention portion is not limited to the above. The prevention portion may be positioned on a grommet side, or positioned respectively in the pin and the grommet.

The present invention may have the following characteristic.

Namely, the prevention portion is positioned in one portion of an insertion leg of the pin, and is provided to extend along a length direction of the slit. Consequently, the prevention portion is positioned in one portion of the insertion leg of the pin, and is provided to extend along the length direction of the slit so as to be capable of preventing a foreign matter such as gravel and the like from entering in through the slit.

The present invention may also have the following characteristic.

Namely, the prevention portion is positioned in one portion of the leg piece of the grommet, and is provided to extend in the length direction of the slit. Consequently, the prevention portion is positioned in one portion of the leg piece of the grommet, and is provided to extend in the length direction of the slit so as to be capable of preventing a foreign matter such as gravel and the like from entering in through the slit.

The present invention may also have the following characteristic.

Namely, the prevention portion is provided to extend along the length direction of the slit from a lower surface of a flange of the grommet. Consequently, the prevention portion is provided to extend along the length direction the slit from the lower surface of the flange of the grommet so as to be capable of preventing a foreign matter such as gravel and the like from entering in through the slit.

The present invention may also have the following characteristic.

Namely, the prevention portion is a wall portion (for example, a blade portion) provided to extend in the insertion leg of the pin. Consequently, the prevention portion is the wall portion provided to extend in the insertion leg of the pin so as to be capable of preventing a foreign matter such as gravel and the like from entering in by the wall portion.

The present invention may also have the following characteristic.

Namely, the insertion leg of the pin comprises a central leg including an abutting portion which contacts with an inner periphery of the leg piece of the grommet, and the blade portion extending outwardly from the central leg. Consequently, the blade portion extending outwardly from the central leg is provided in the insertion leg of the pin so as to be capable of preventing a foreign matter such as gravel and the like from entering in by the blade portion.

The present invention may also have the following characteristic.

Namely, the blade portion (for example, a central blade portion) is positioned in a middle of a length of the central leg. Consequently, the blade portion is positioned in a middle of the length of the central leg so as to be capable of preventing a foreign matter such as gravel and the like from entering in from a middle of the length of the central leg.

The present invention may also have the following characteristic.

Namely, the blade portion (for example, an end blade portion) is positioned in an end portion of the central leg. Consequently, the blade portion is positioned in the end portion of the central leg so as to be capable of preventing a foreign matter such as gravel and the like from entering in through the end portion of the central leg.

The present invention may also have the following characteristic.

Namely, an inner peripheral surface of the leg piece of the grommet, and an outer peripheral surface of the insertion leg of the pin abutting against the inner peripheral surface, are line-contacted along the length direction of the leg portion. Consequently, the inner peripheral surface of the leg piece of the grommet, and the outer peripheral surface of the insertion leg of the pin are line-contacted along the length direction of the leg portion so as to be capable of reducing a friction resistance at a travel time of the pin.

The present invention may also have the following characteristic.

Namely, the inner peripheral surface of the leg piece of the grommet is a flat surface, and the outer peripheral surface of the insertion leg of the pin is a protruding surface protruding toward the flat surface. Consequently, the inner peripheral surface of the leg piece of the grommet is the flat surface, and the outer peripheral surface of the insertion leg of the pin is the protruding surface so as to be capable of reducing the friction resistance at the travel time of the pin.

Effect of the Invention

Since the present invention is structured as mentioned above, the prevention portion, which prevents a foreign matter such as gravel and the like from entering in, is provided at least in either one of the pin or the grommet so as to be capable of preventing a foreign matter such as gravel and the like from entering into the insertion hole of the grommet wherein the pin is inserted.

BEST MODES OF CARRYING OUT THE INVENTION

First, the first embodiment of the present invention will be explained based on FIG. 1 to FIG. 19.

Figure 1:
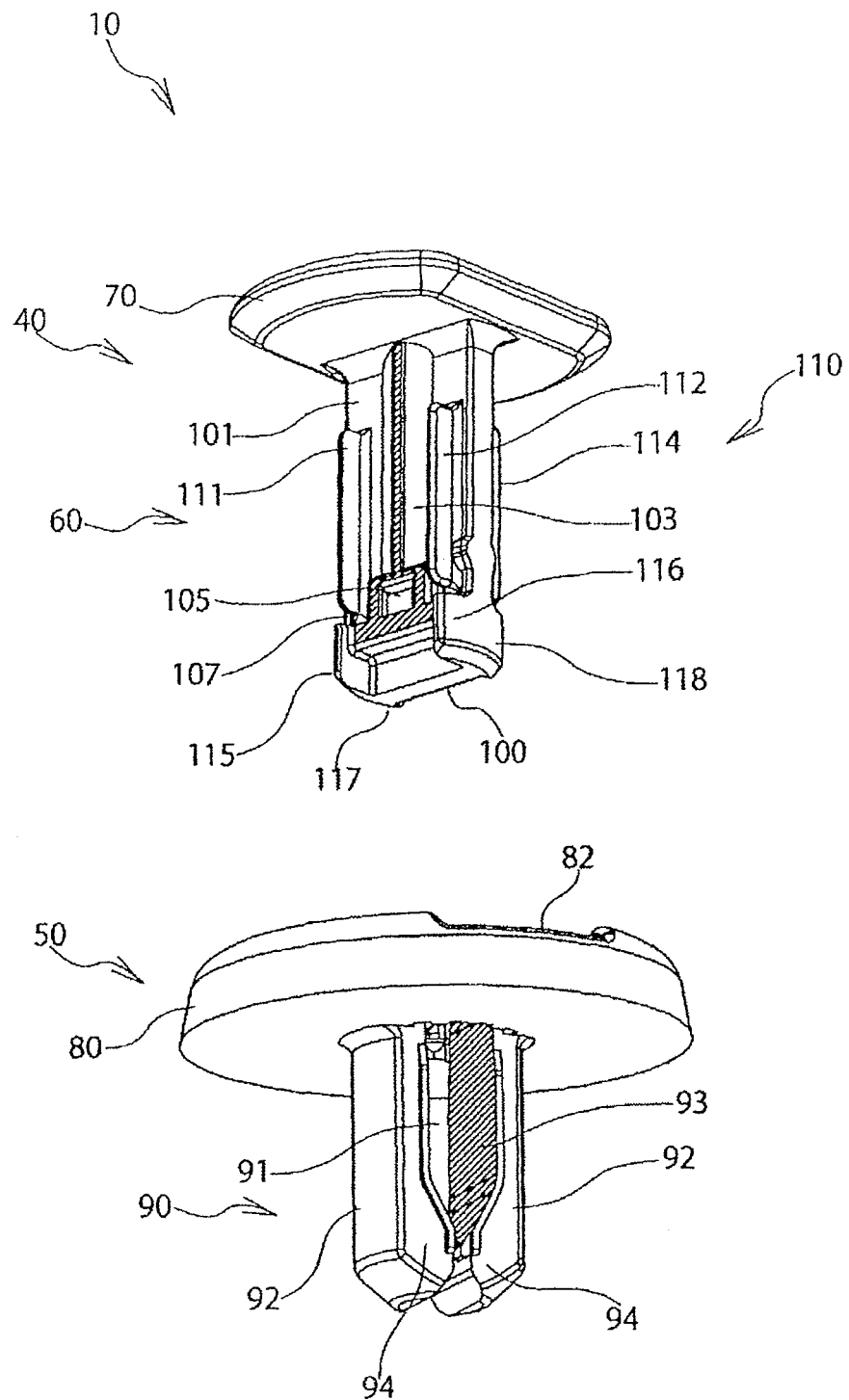
FIG. 1 is an exploded perspective view of a clip according to the first embodiment of the present invention.
Figure 2:
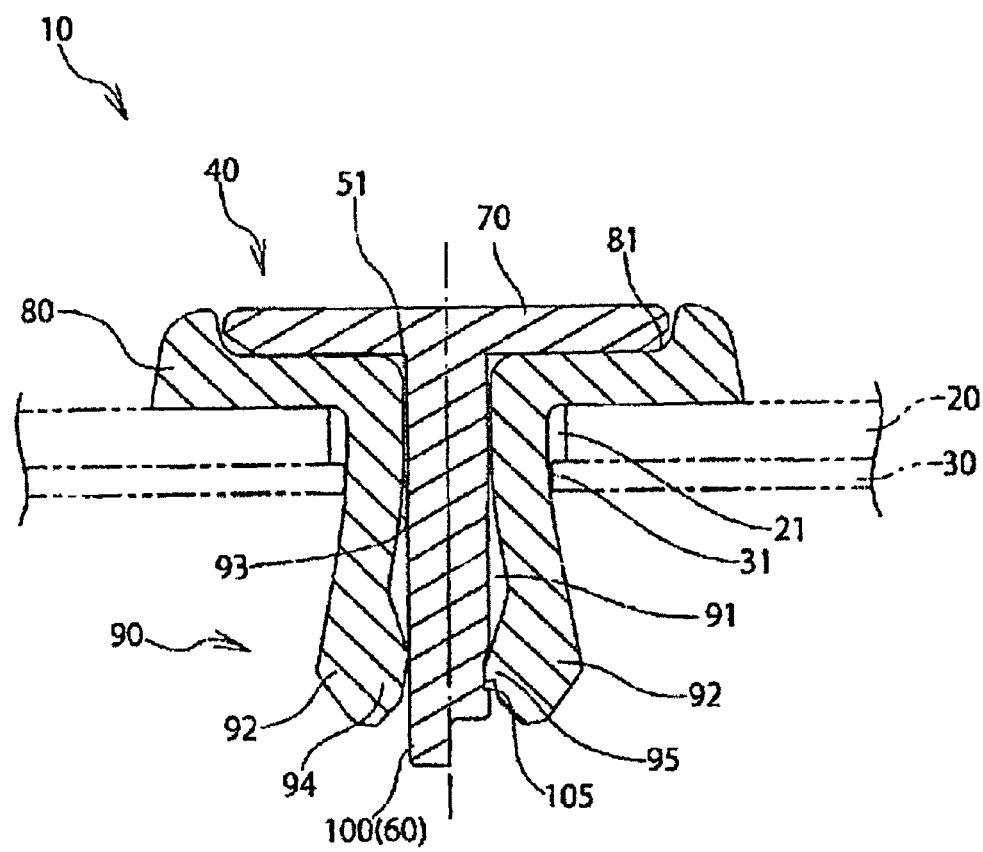
FIG. 2 is a cross-sectional view of an attachment state of the clip.

In FIG. 1, the reference numeral 10 represents a clip, and as shown in FIG. 2, the clip 10 is used for attaching a component 30 such as an undercover and the like, for example, relative to a base 20 such as a body and the like of an automobile.

Incidentally, although the body of the automobile has been illustrated as an example of the base 20, and the undercover has been illustrated as an example of the component 30, they are not limited to the above.

As shown in FIG. 2, in the aforementioned base 20, the clip can be inserted, and there is provided a square-shaped attachment hole 21 passing through front and back surfaces. Also, in the component 30, the clip 10 can be inserted, and there is provided a square-shaped through-hole 31 matching to the attachment hole 21 and passing through front and back surfaces.

As shown in FIG. 1, the clip 10 roughly comprises the following parts.

Incidentally, the following (1) and (2) will be described hereinafter.

(1) Pin 40

(2) Grommet 50

Incidentally, the parts of the clip 10 are not limited to the aforementioned (1) and (2).

(Pin 40)

As shown in FIGS. 1 to 10, the pin 40 can be inserted into an insertion hole 51 of the later-described grommet 50. The pin 40 is integrally molded by thermoplastic synthetic resin having an appropriate amount of rigidity and elasticity, for example, PBT (polybutylene terephthalate).

Specifically, as shown in FIGS. 1 to 10, the pin 40 roughly includes the following respective portions.

Incidentally, the following (1) and (2) will be described hereinafter.

(1) Insertion leg 60

(2) Head portion 70

Incidentally, each portion of the pin 40 is not limited to the aforementioned (1) and (2).

(Grommet 50)

As shown in FIG. 1, FIG. 2, and FIGS. 11 to 15, the grommet 50 includes the insertion hole 51 in which the later-described insertion leg 60 of the pin 40 can be inserted, and by a slit 91 provided in a length direction of the later-described leg portion 90, there is formed a plurality of, for example, two pieces of leg pieces 92. As shown in FIG. 2, in the grommet 50, one portion can be spread by inserting the insertion leg 60 into the insertion hole 51. As is the case with the pin 40, the grommet 50 is integrally molded by thermoplastic synthetic resin having an appropriate amount of rigidity and elasticity, for example, POM (polyacetal).

Incidentally, although two pieces are illustrated as an example of the number of the leg pieces 92, it is not limited to the above, and the leg pieces 92 may be formed with three pieces or above.

Specifically, as shown in FIG. 1 and FIGS. 11 to 15, the grommet 50 roughly includes the following respective portions.

Incidentally, the following (1) and (2) will be described hereinafter.

(1) Flange 80

(2) Leg portion 90

Incidentally, each portion of the grommet 50 is not limited to the aforementioned (1) and (2).

(Insertion Leg 60)

As shown in FIGS. 1 to 10, the insertion leg 60 can be inserted into the insertion hole 51 of the later-described grommet 50.

Specifically, as shown in FIGS. 1 to 10, the insertion leg 60 roughly includes the following respective portions.

Incidentally, the following (1) and (2) will be described hereinafter.

(1) Central leg 100

(2) Prevention portion 110

Incidentally, each portion of the insertion leg 60 is not limited to the aforementioned (1) and (2).

(Head Portion 70)

Figure 3:
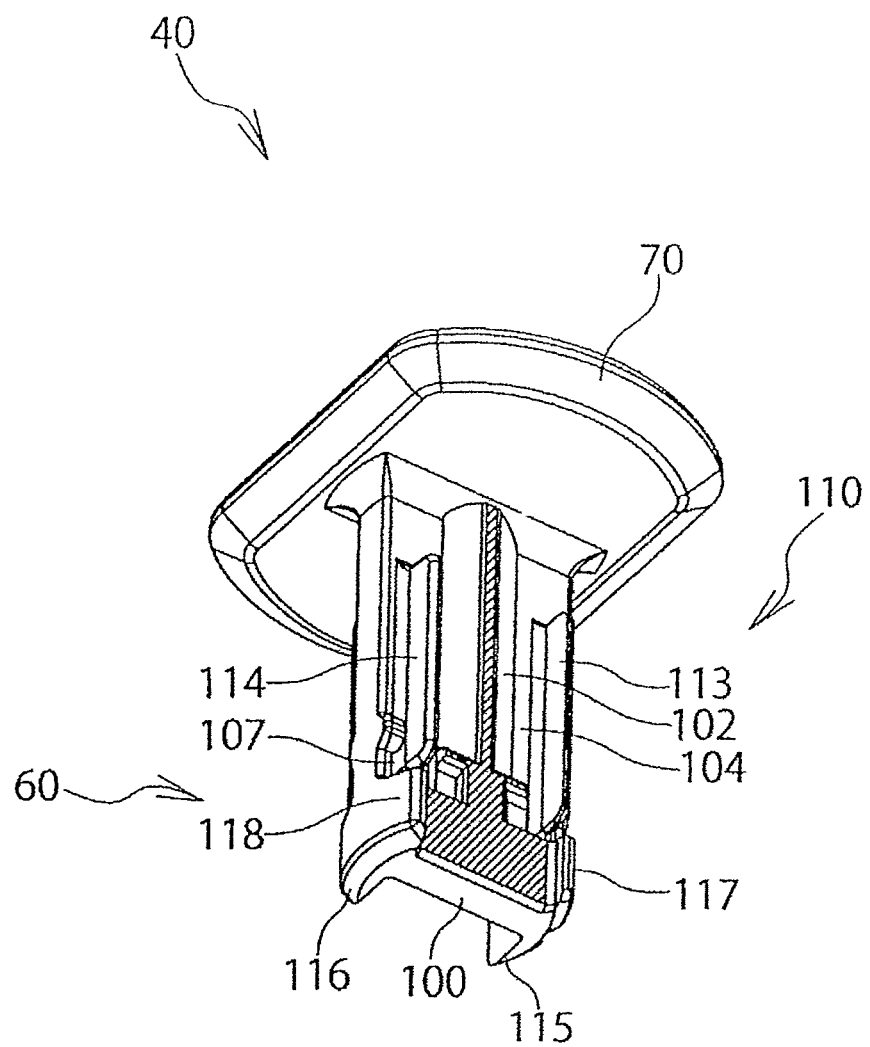
FIG. 3 is a perspective view of a pin according to the first embodiment of the present invention.
Figure 4:
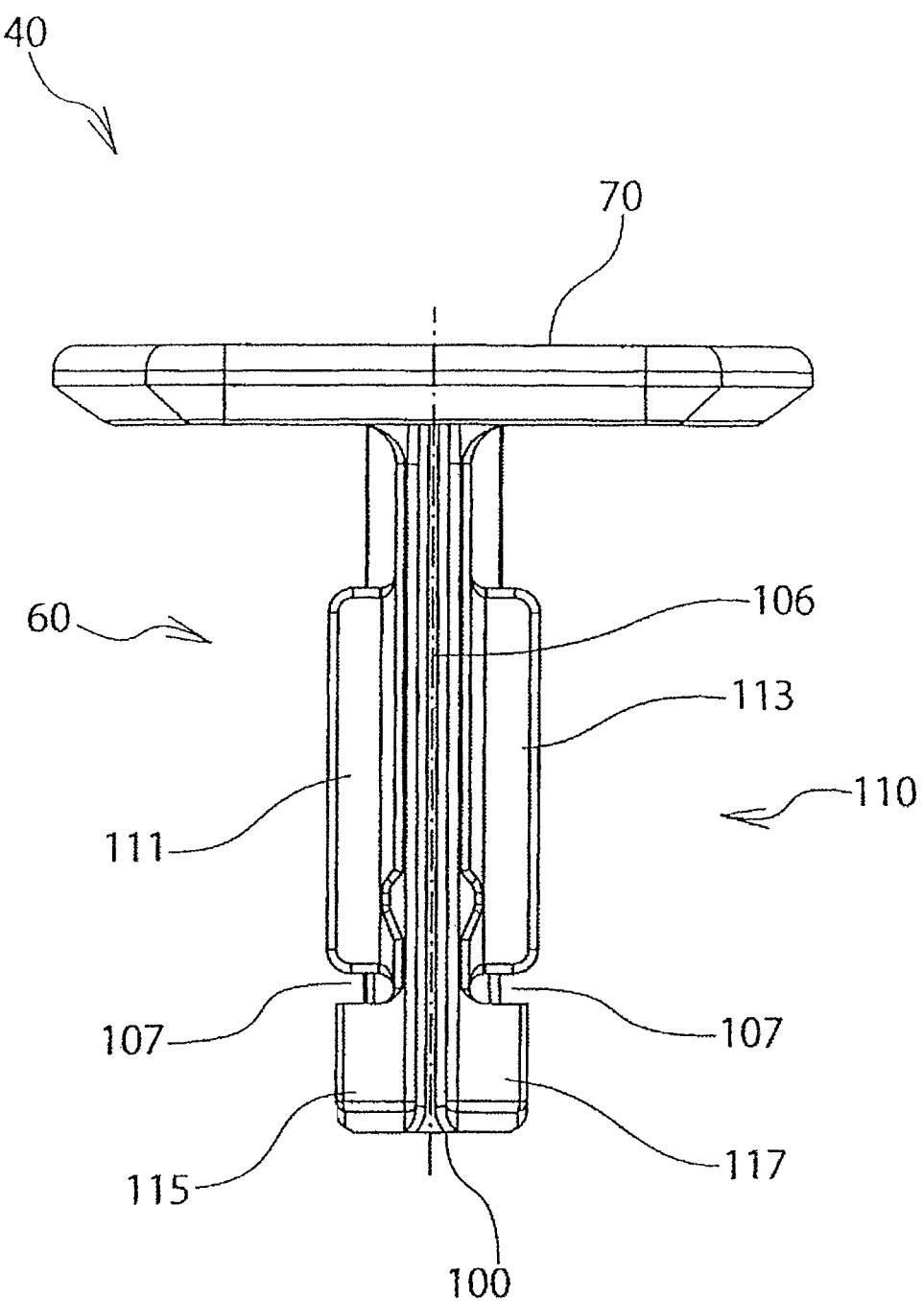
FIG. 4 is a front view of the pin.
Figure 5:
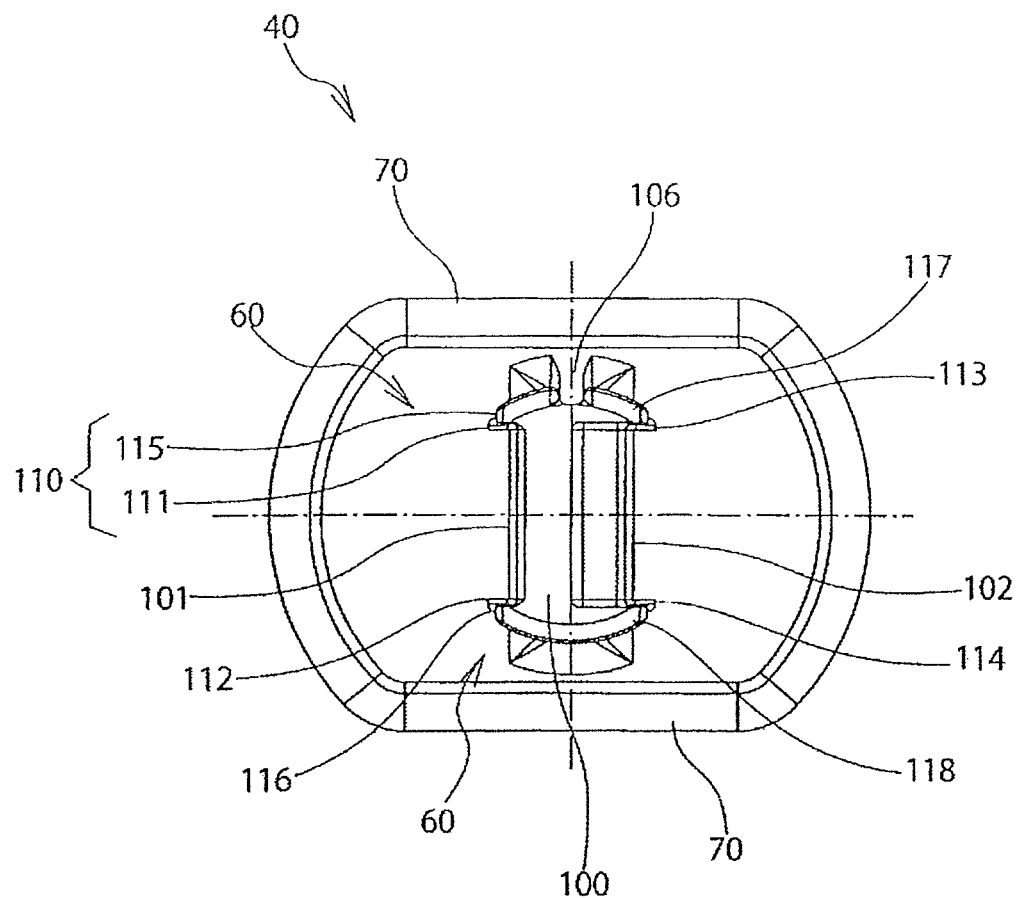
FIG. 5 is a bottom view of the pin.
Figure 6:
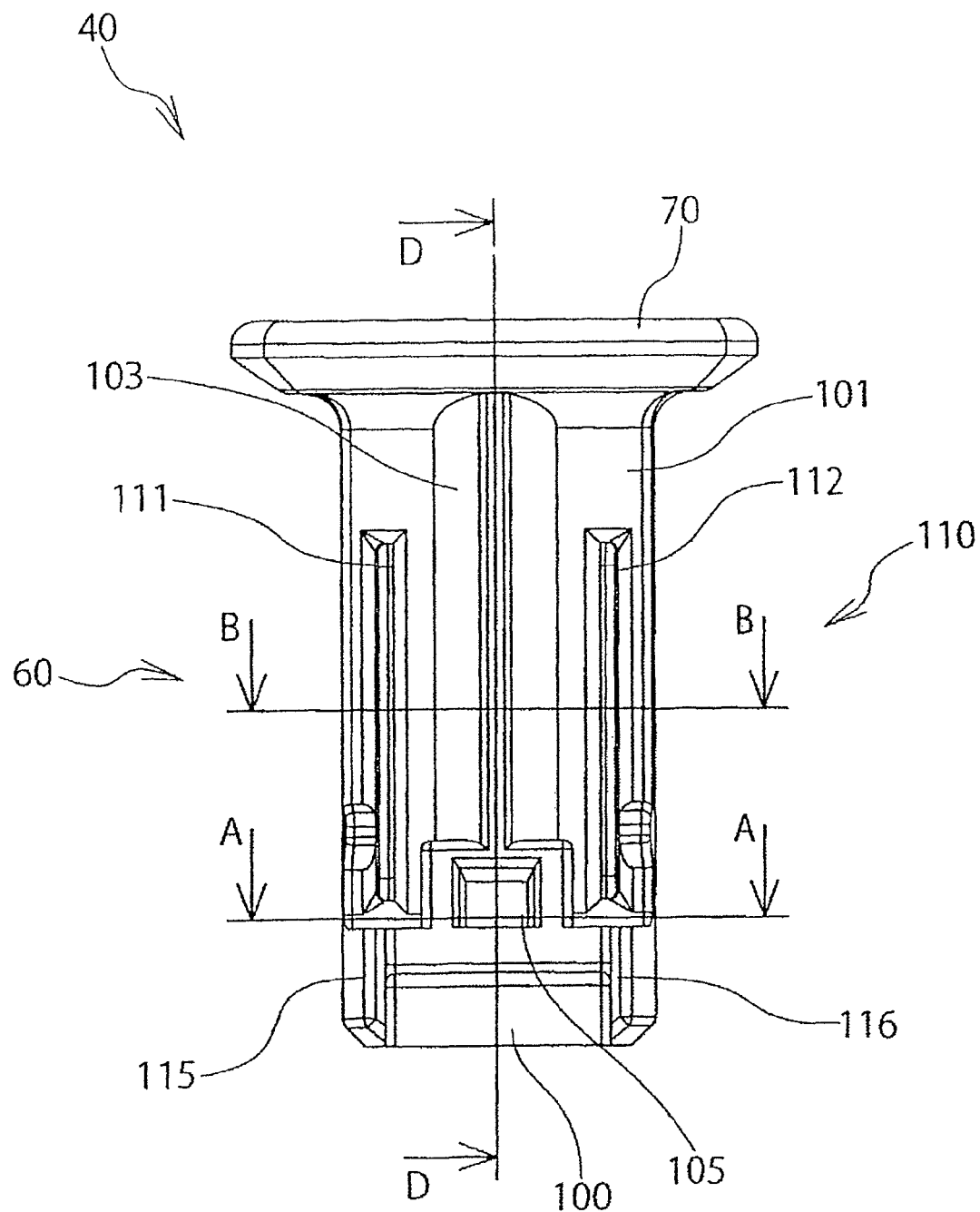
FIG. 6 is a side view of the pin.
Figure 7:
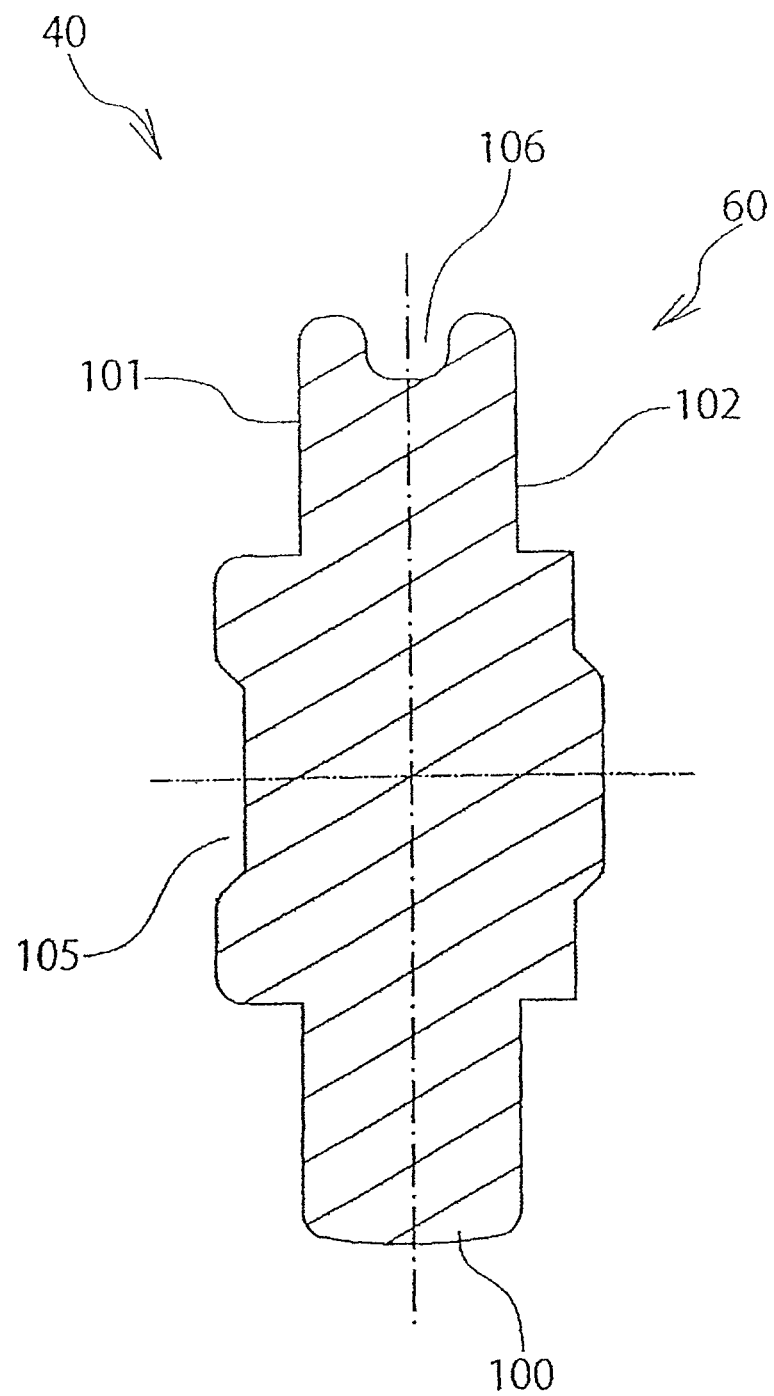
FIG. 7 is a cross-sectional view taken along a line A-A in FIG. 6.

As shown in FIGS. 1 to 6, FIG. 8, and FIG. 10, the head portion 70 projects from an end portion of the insertion leg 60, i.e., an upper end portion in FIG. 1, and an outer diameter thereof is set larger than an inner diameter of the insertion hole 51 of the later-described grommet 50. Specifically, as shown in FIG. 5, the head portion 70 forms a planar surface in a rectangle shape or an oval shape.

Incidentally, although the head portion 70 forms the planar surface in the rectangle shape or the oval shape, it is not limited to the above.

(Flange 80)

As shown in FIG. 1, FIG. 2, and FIGS. 11 to 15, in the flange 80, in a center thereof, there is formed the insertion hole 51 in which the insertion leg 60 of the pin 40 can be inserted, and an outer diameter is set larger than an inner diameter of the attachment hole 21 of the base 20.

Specifically, as shown in FIG. 1, and FIGS. 11 to 15, the flange 80 is formed approximately in a disc-like shape, and the insertion hole 51 is formed approximately in a rectangle shape long in a diametrical direction.

Incidentally, although the flange portion 80 is formed approximately in the disc-like shape, and the insertion hole 51 is formed approximately in the rectangle shape, they are not limited to the above.

Specifically, as shown in FIG. 1, FIG. 2, and FIGS. 11 to 15, the flange 80 includes the following respective portions beside the insertion hole 51.

Incidentally, each portion of the flange 80 is not limited to the following (1) and (2).

(1) Depressed Portion 81

Figure 11:
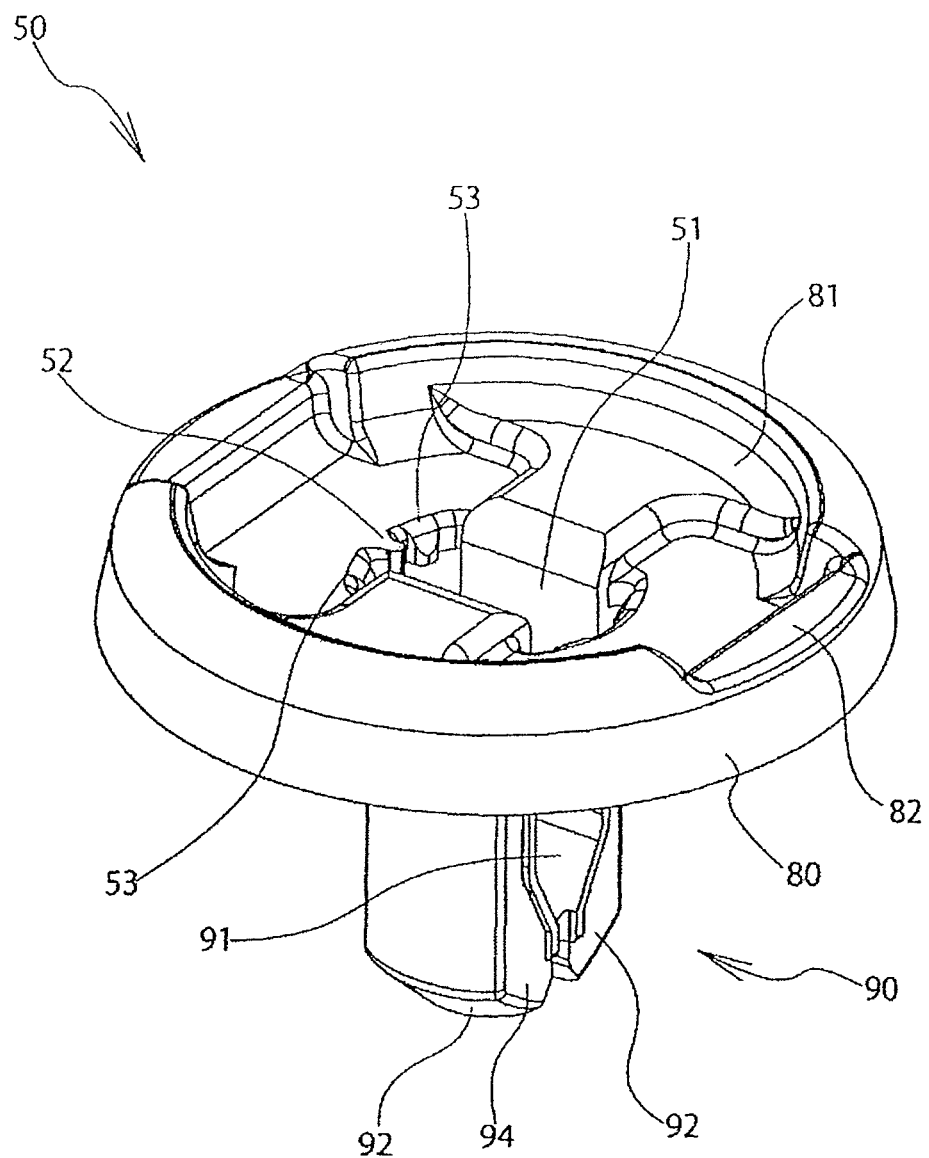
FIG. 11 is a perspective view showing a grommet according to the first embodiment of the present invention from above.
Figure 12:
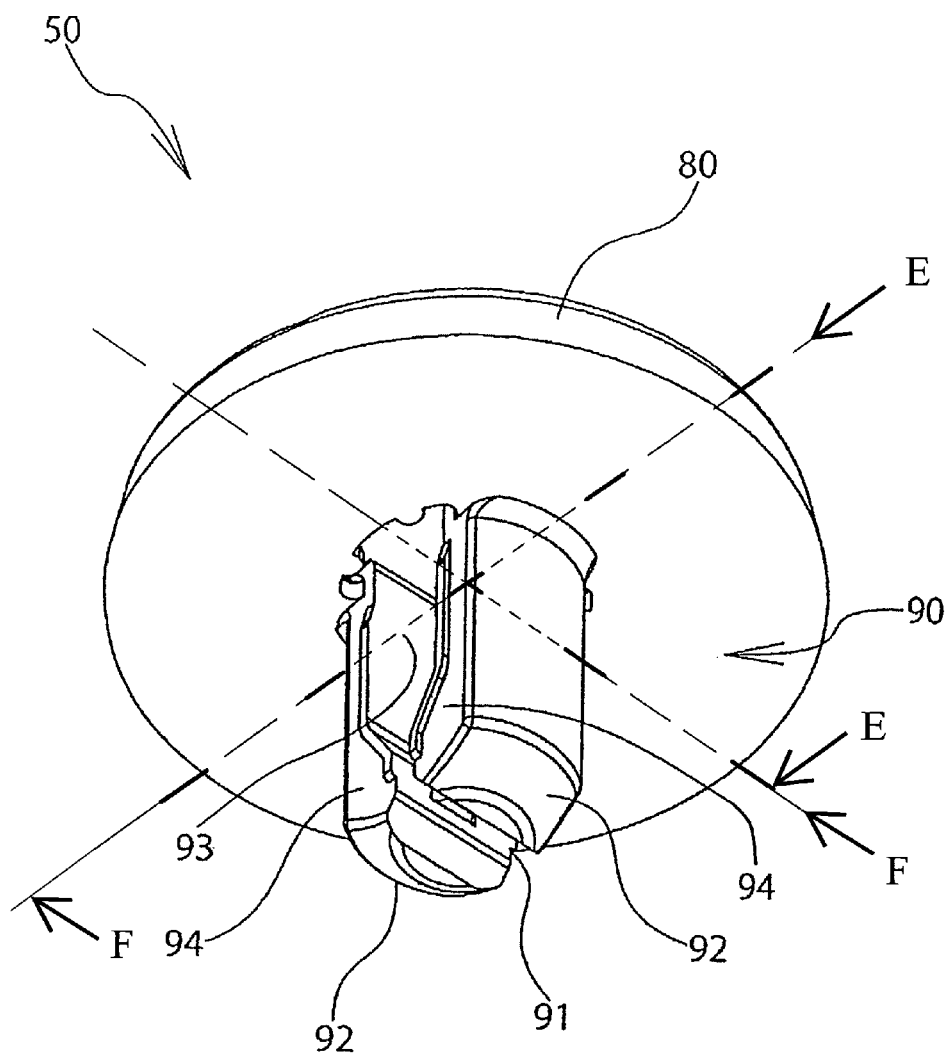
FIG. 12 is a perspective view showing the grommet from below.
Figure 13:
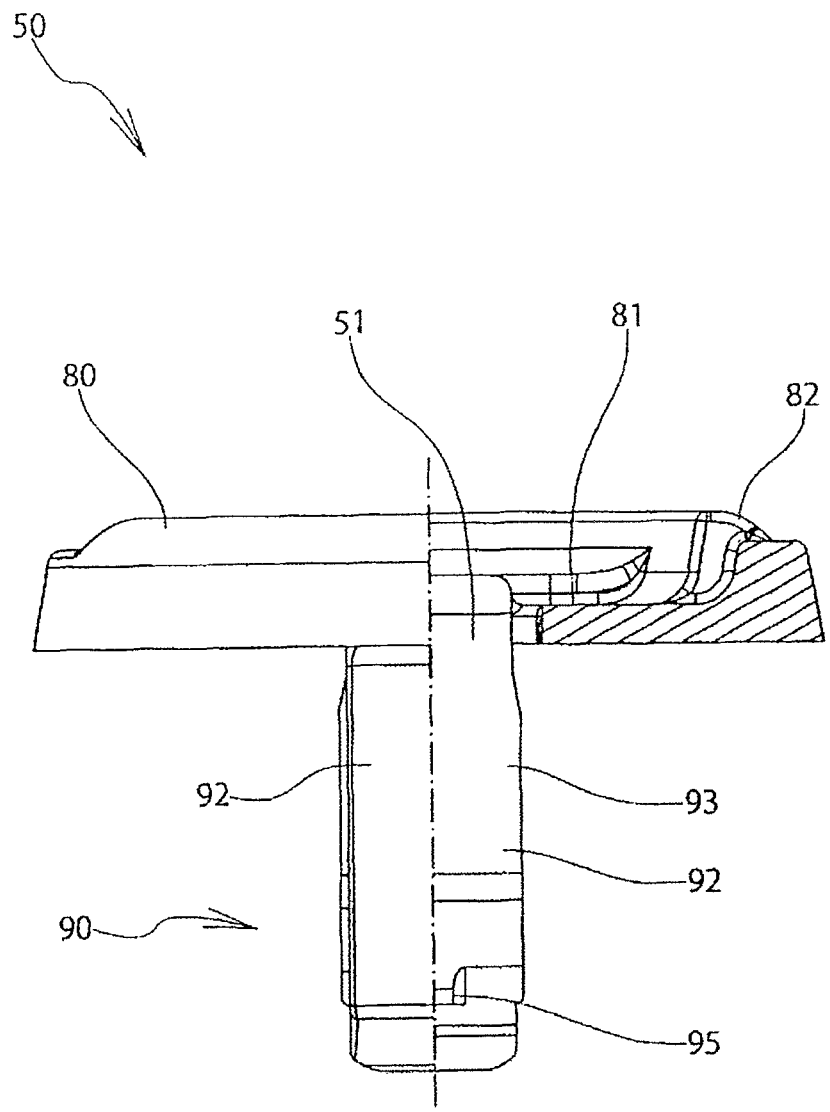
FIG. 13 is a side view of the grommet wherein one half is a cross-sectional surface taken along line E-E in FIG. 12.
Figure 15:
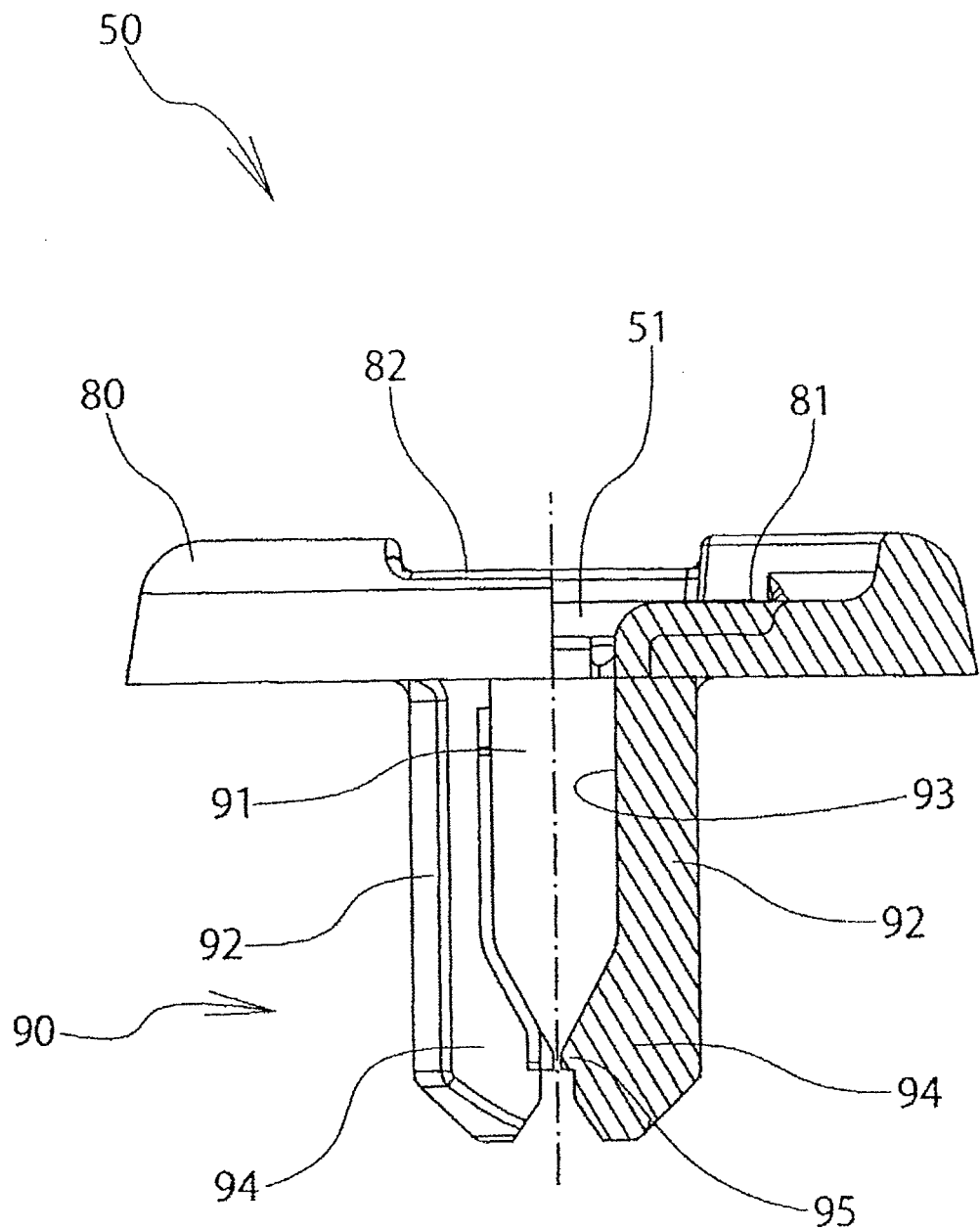
FIG. 15 is a front view of the grommet wherein one half is a cross-sectional surface taken along line F-F in FIG. 12.

As shown in FIG. 11, FIG. 13, and FIG. 15, the head portion of the pin 40 fits into a depressed portion 81. The depressed portion 81 is depressed approximately in a circle shape with a central focus on the insertion hole 51 from an upper surface of the flange 80. As shown in FIG. 2, in a position wherein a lower surface of the head portion 70 abuts against a bottom surface of the depressed portion 81 (hereinafter, called a "locking position"), an upper surface of the head portion 70 and an annular projecting edge portion around the flange 80 are aligned approximately with one surface.

(2) Concave Portions 82

As shown in FIG. 1, FIG. 11, FIG. 13, and FIG. 15, in a state wherein the head portion 70 of the pin 40 is fitted into the depressed portion 81, although it is not shown in the figures, a driver and the like are inserted into concave portions 82, and the concave portions 82 are for raising the head portion 70 of the pin 40 from the bottom surface of the depressed portion 81. As shown in FIG. 1 and FIG. 11, the concave portions 82 are positioned on both end portions in a longitudinal direction thereof with the central focus on the insertion hole 51, and are formed by concaving the annular projecting edge portion around the depressed portion 81 in a concave shape.

Figure 14:
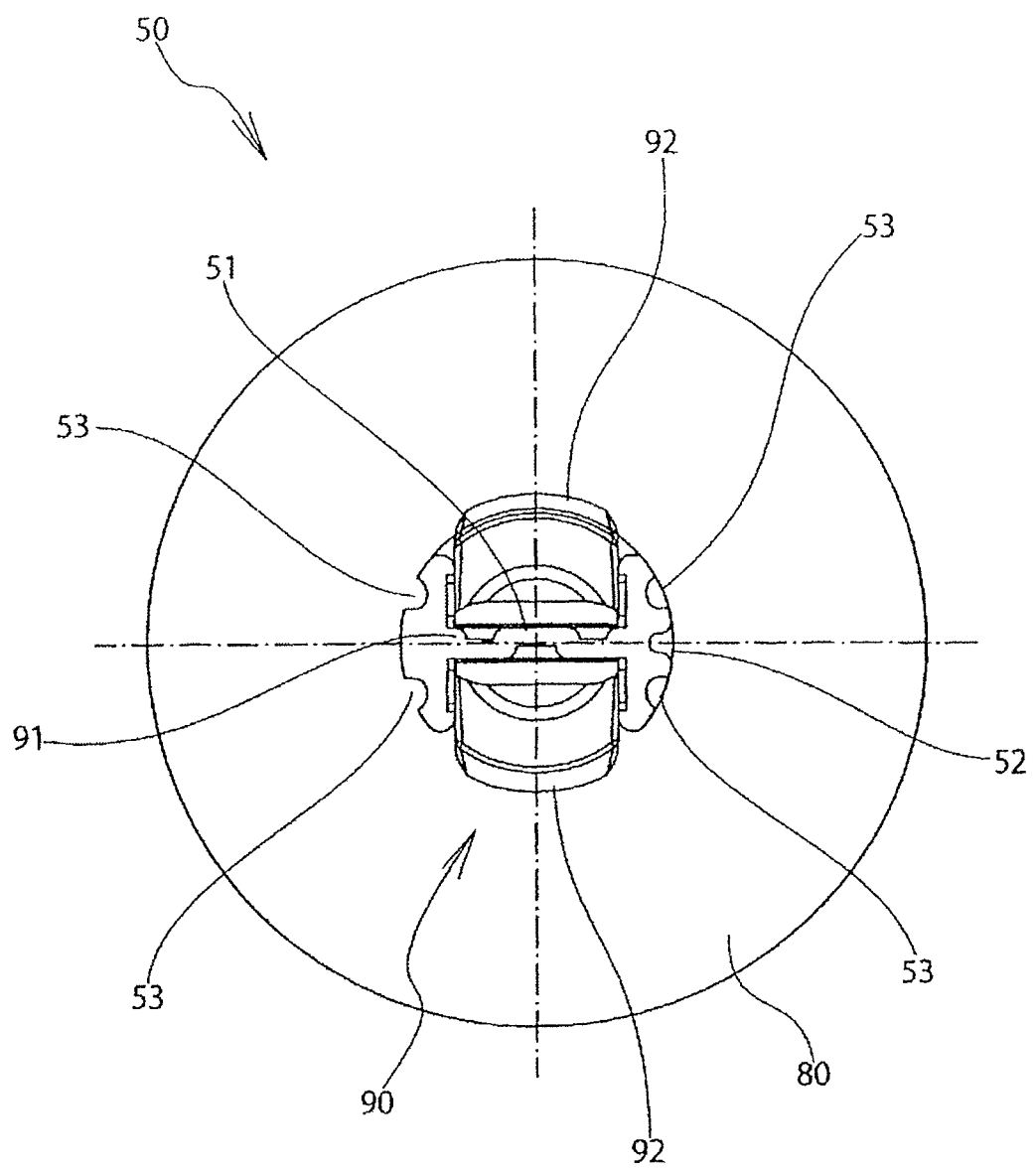
FIG. 14 is a bottom view of the grommet.

On the other hand, as shown in FIG. 1, FIG. 11, and FIG. 14, the insertion hole 51 includes the following respective portions.

Incidentally, each portion of the insertion hole 51 is not limited to the following (3) and (4).

(3) Slide Protrusion 52

As shown in FIG. 14, a slide protrusion 52 protrudes into the insertion hole 51, and is for slidably guiding the insertion leg 60 of the pin 40 inserted into the insertion hole 51. The slide protrusion 52 protrudes in a semicircular shape of a cross-sectional surface at least from one end portion among both end portions in the longitudinal direction of the insertion hole 51. The slide protrusion 52 fits into a slide groove 106 of the later-described central leg 100, and when the pin 40 is inserted, the slide protrusion 52 slides relatively along the slide groove 106.

(4) Temporary Attaching Protrusions 53

Figure 16:
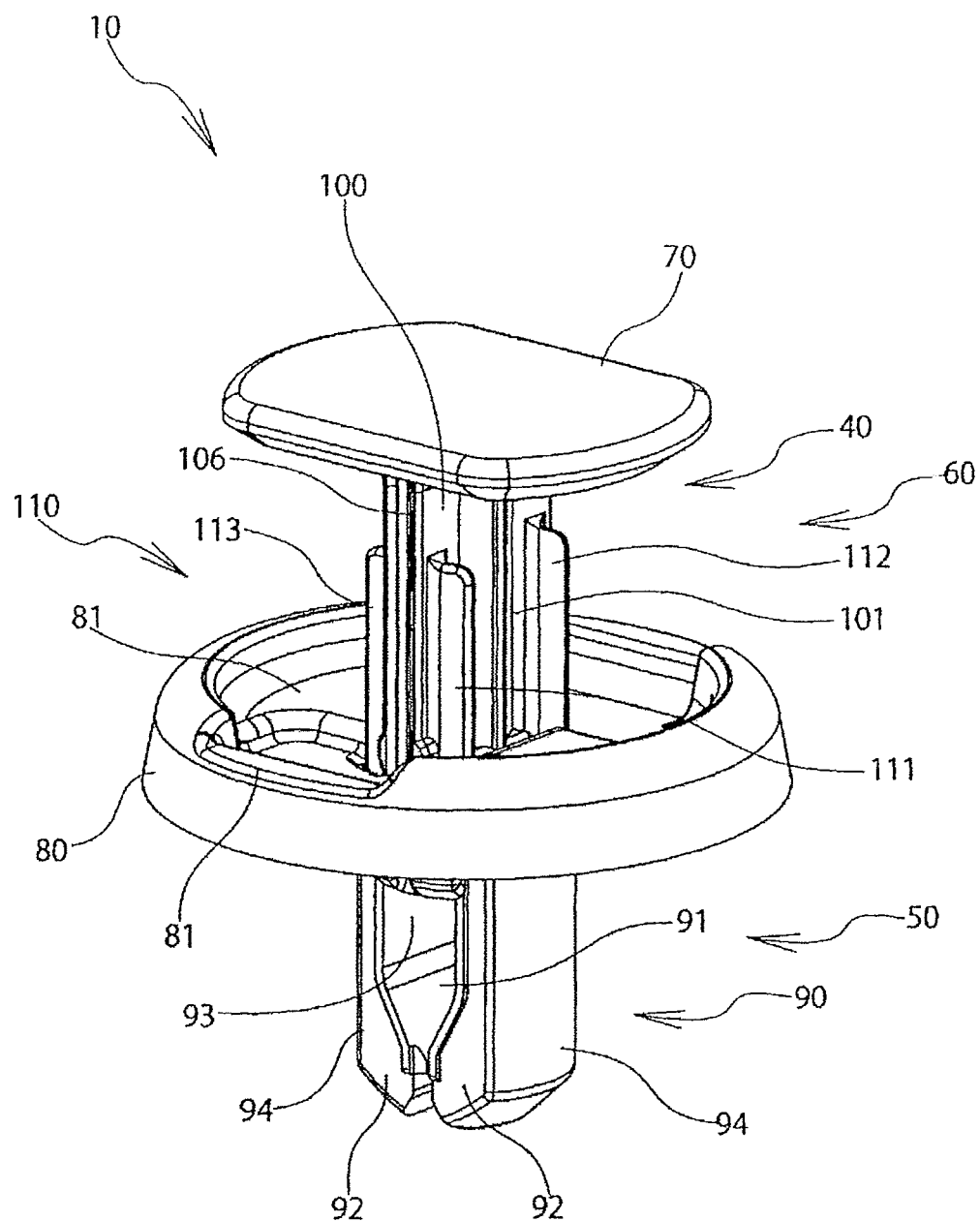
FIG. 16 is a perspective view of a temporary attached state of the clip.
Figure 17:
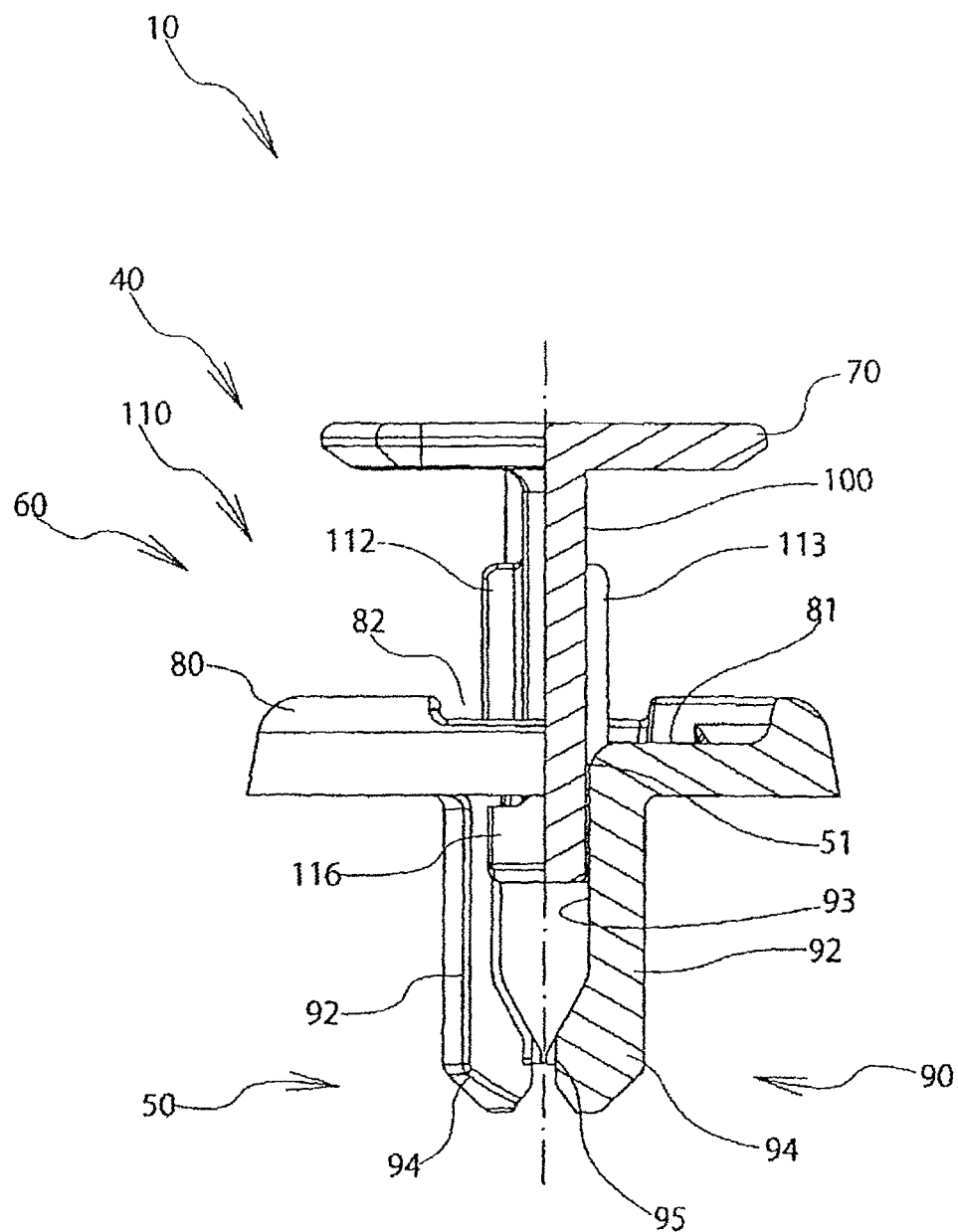
FIG. 17 is a front view of the clip in the temporary attached state wherein one half is a cross-sectional surface taken along line G-G in FIG. 18.
Figure 18:
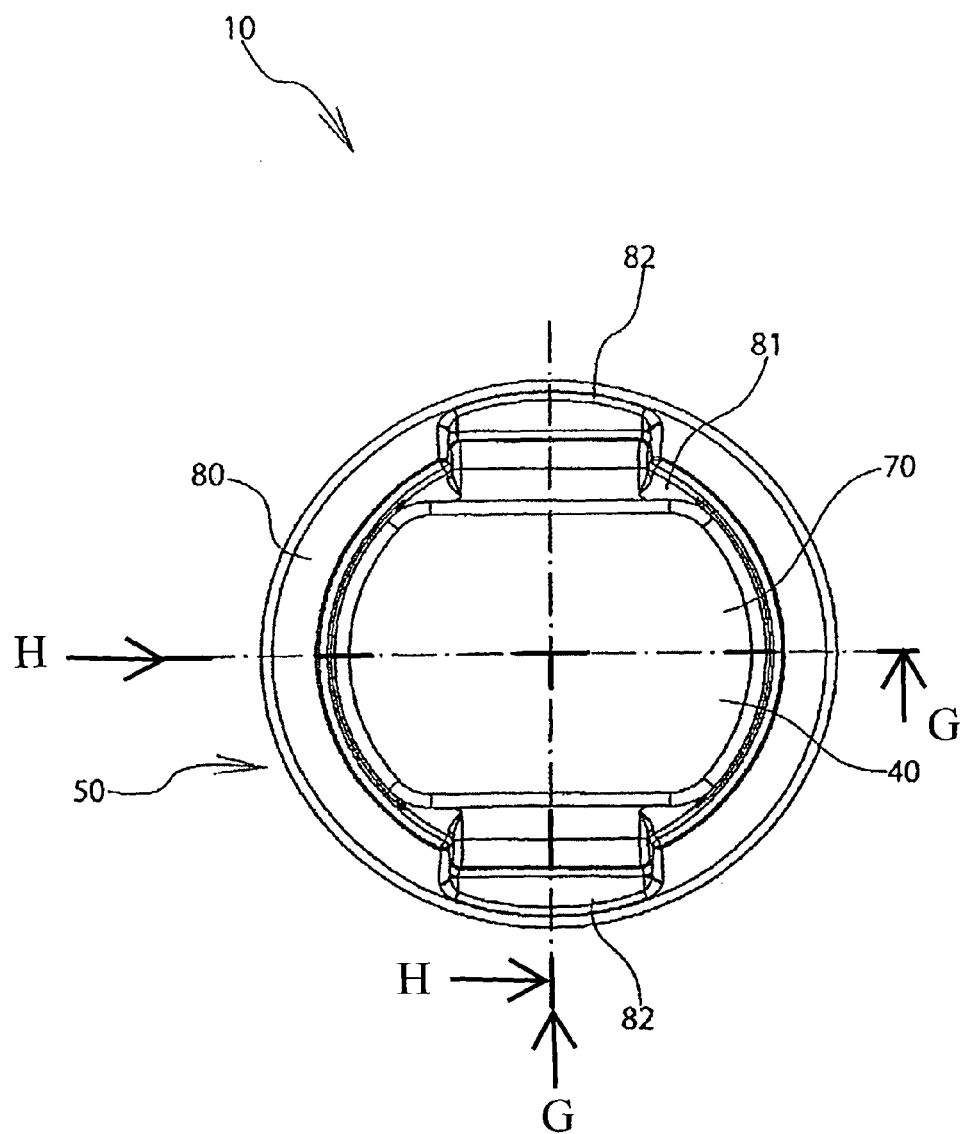
FIG. 18 is a plan view of the clip in the temporary attached state.
Figure 19:
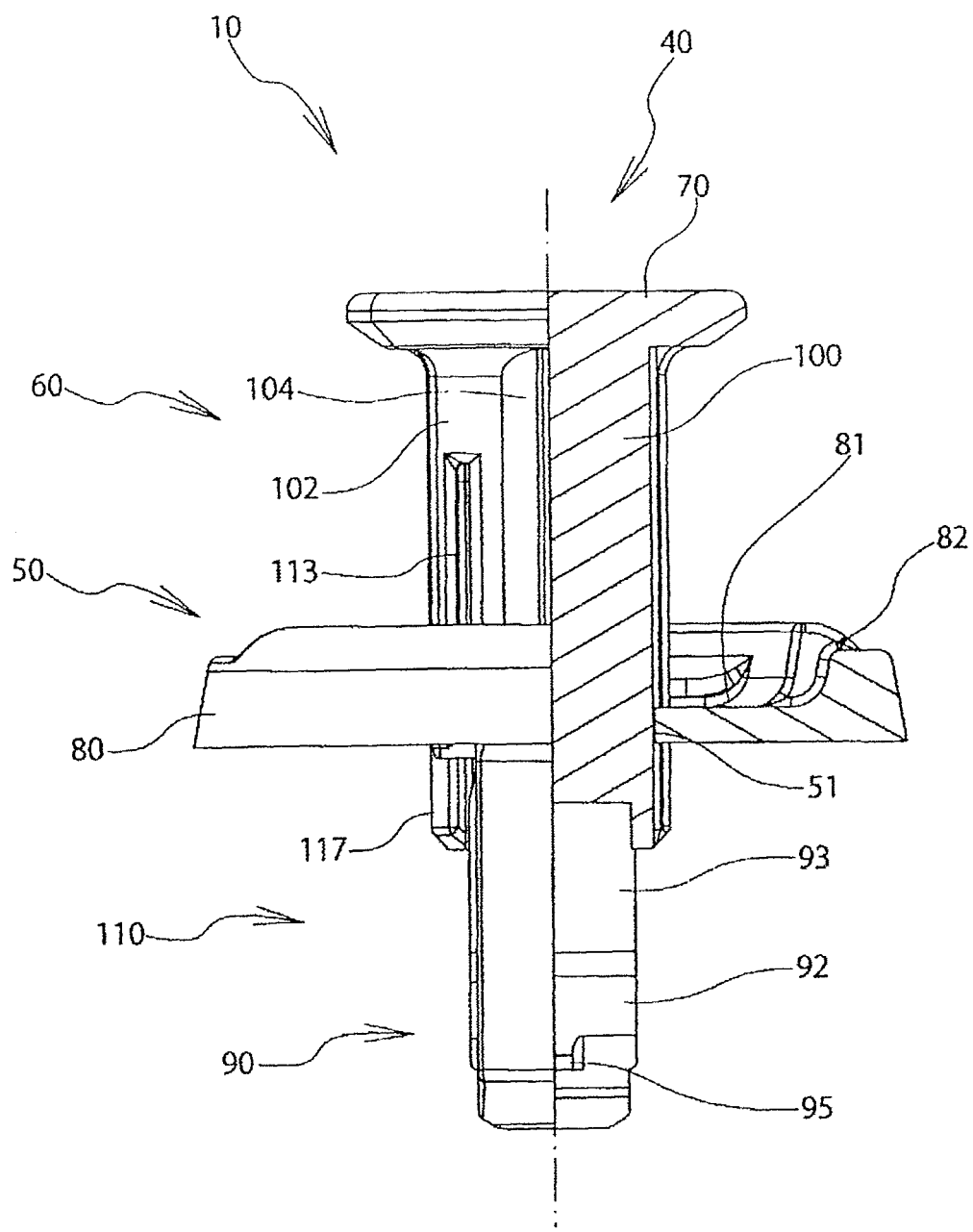
FIG. 19 is a front view of the clip in the temporary attached state wherein one half is a cross-sectional surface taken along line H-H in FIG. 18.

As shown in FIG. 14, temporary attaching protrusions 53 protrude into the insertion hole 51, and are for temporarily attaching the insertion leg 60 of the pin 40 inserted into the insertion hole 51. The temporary attaching protrusions 53 are positioned at four corners on both end portions in the longitudinal direction of the insertion hole 51 with a total of four pieces, and protrude in a semicircular shape of a cross-sectional surface. The temporary attaching protrusions 53 are fitted into temporary attaching grooves 107 of the later-described central leg 100, and temporarily attach the central leg 100 in a state wherein the central leg 100 is shallowly inserted into the insertion hole 51 (hereinafter, called a "temporary attaching position") as shown in FIG. 16, FIG. 17, and FIG. 19.

(Leg Portion 90)

As shown in FIG. 1, FIG. 2, and FIGS. 11 to 15, the leg portion 90 droops from a lower surface of the flange 80, and can be inserted into the attachment hole 21 of the base 20, and the through-hole 31 of the component 30.

Specifically, as shown in FIG. 1, FIG. 2, and FIGS. 11 to 15, the leg portion 90 includes the following respective portions.

Incidentally, each portion of the leg portion 90 is not limited to the following (1) to (5).

(1) Slit 91

As shown in FIG. 1, FIG. 2, FIG. 11, FIG. 12, FIG. 14, and FIG. 15, the slit 91 is provided in the length direction of the leg portion 90, and is for splitting the leg portion 90 into a plurality of, for example, two pieces of the leg pieces 92. Specifically, the slit 91 extends toward the lower surface of the flange 80 from an end surface of an end portion of the leg portion 90. Also, the slit 91 is provided along the longitudinal direction of the insertion hole 51 of the flange 80, and is opposed in a short direction of the insertion hole 51.

Incidentally, although two pieces are illustrated as an example of the number of the leg pieces 92, it is not limited to the above, and the number of the leg pieces 92 can increase to three pieces or above by increasing the number of the slit 91.

(2) Leg Pieces 92

As shown in FIG. 1, FIG. 2, and FIGS. 11 to 15, two pieces of the leg pieces 92 are formed, and are opposed by sandwiching the slit 91.

(3) Flat Surface 93

As shown in FIG. 1, FIG. 2, FIG. 12, FIG. 13, and FIG. 15, a flat surface 93 is formed on an inner peripheral surface of the leg piece 92, and is nearly formed vertically in the same figures.

Although it is not shown in the figures, the flat surface abuts against protruding surfaces 103 and 104 of the insertion leg 60 of the later-described pin 40, and both portions line-contact along the length direction of the leg portion 90.

Incidentally, as for a structure allowing the inner peripheral surface of the leg piece 92 of the grommet 50, and an outer peripheral surface of the insertion leg 60 of the pin 40 abutting against the inner peripheral surface to line-contact along the length direction of the leg portion 90, it is not limited to the flat surface 93.

(4) End Wall-Thickness Portions 94

As shown in FIG. 1, FIG. 2, FIG. 11, FIG. 12, and FIG. 15, end wall-thickness portions 94 are positioned in end portions of the leg pieces 92, and gradually increase a wall thickness of the leg piece 92 toward the end portion in such a way as to protrude toward the slit 91.

(5) Locking Claw 95

As shown in FIG. 2, FIG. 13, and FIG. 15, a locking claw 95 is positioned on an inner surface of the end wall-thickness portions 94, and protrudes toward the slit 91 approximately in a trapezoidal shape or approximately in a triangular shape of a cross-sectional surface. The locking claw 95 is structured by an inclined surface obliquely inclining downward toward the slit 91; and an approximately horizontal lower surface in FIG. 15 positioned in an inclined lower end of the inclined surface.

As shown in FIG. 2, in the locking position, the locking claw 95 is fitted into the later-described locking groove 105 of the pin 40, and locks the pin 40 in the locking position.

(Central Leg 100)

As shown in FIGS. 1 to 10, the central leg 100 contacts with an inner periphery of the leg pieces 92 of the grommet 50. The central leg 100 is formed in a plate shape; has a side width below a right-and-left side width in the longitudinal direction of the insertion hole 51 of the flange 80, for example, an approximately equal side width; and has a thickness below a front-and-back side width in the longitudinal direction of the insertion hole 51, for example, a thickness thinner than the side width.

Specifically, as shown in FIGS. 1 to 10, the central leg 100 includes the following respective portions.

Incidentally, each portion of the central leg 100 is not limited to the following (1) to (5).

(1) First and Second Abutting Portions 101 and 102

As shown in FIG. 1, FIG. 3, FIGS. 5 to 8, and FIG. 10, first and second abutting portions 101 and 102 are positioned on front and back surfaces facing back-to-back in a thickness direction of the central leg 100, and contact with the inner periphery of the leg pieces 92 of the grommet 50, i.e., the flat surface 93 or the end wall-thickness portions 94.

(2) First and Second Protruding Surfaces 103 and 104

Figure 8:
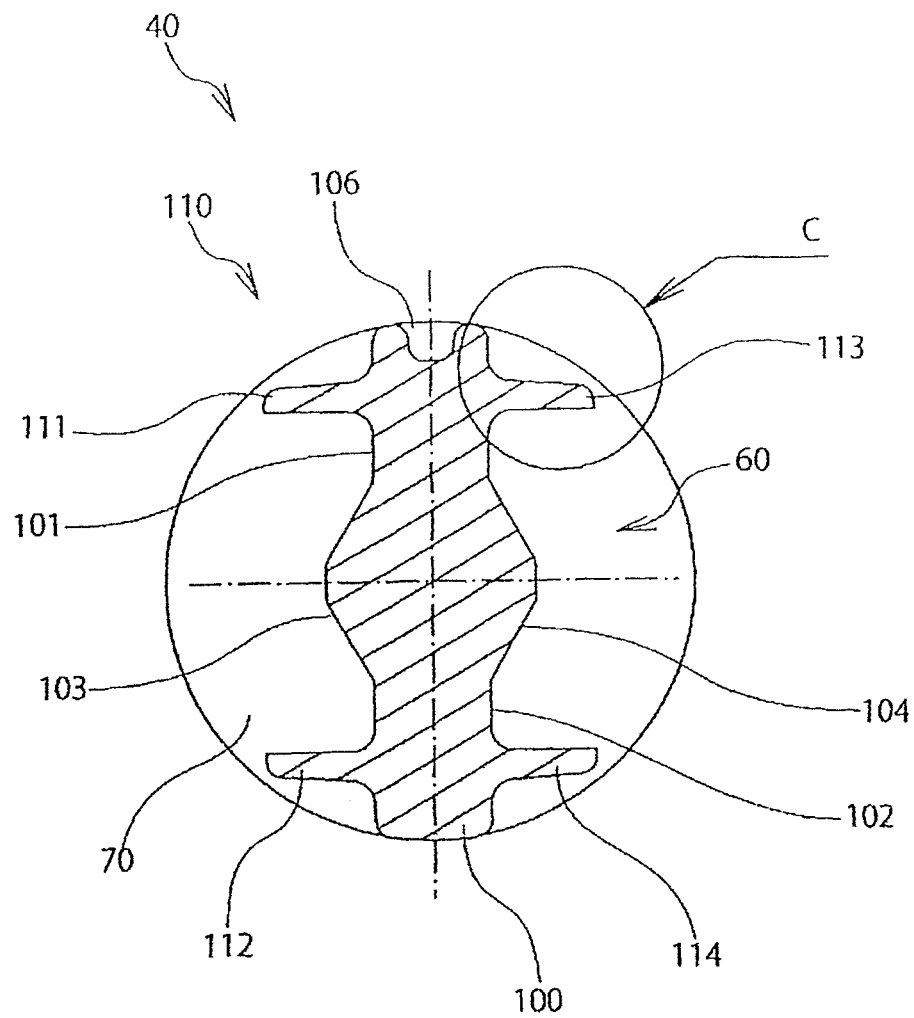
FIG. 8 is a cross-sectional view taken along a line B-B in FIG. 6.
Figure 9:
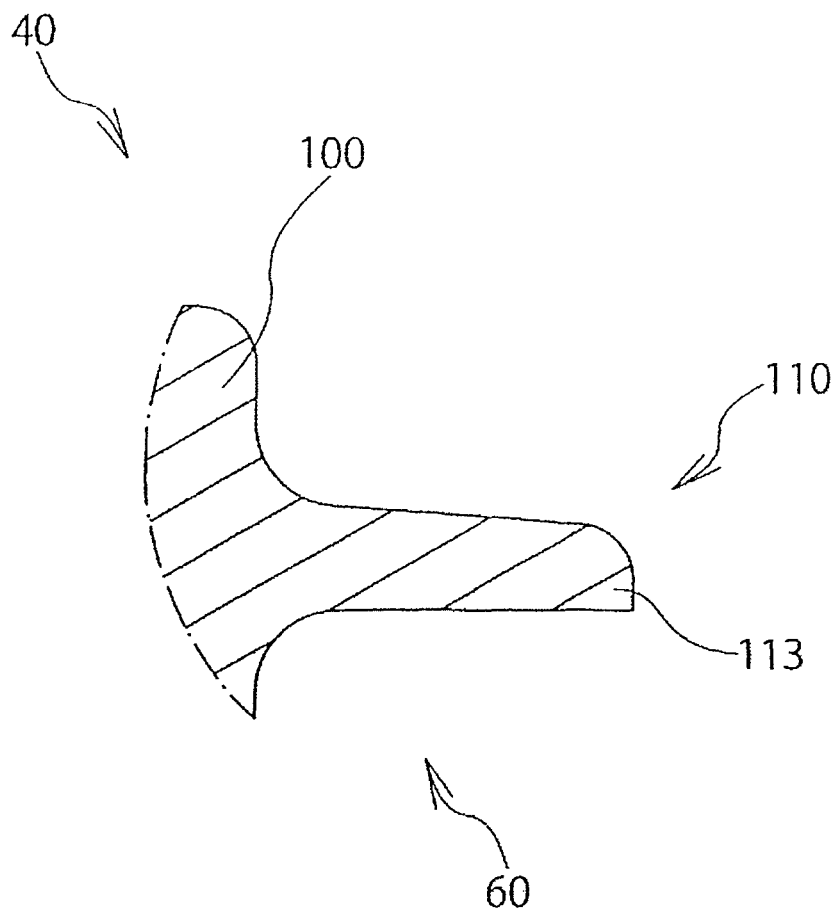
FIG. 9 is an enlarged view of a C portion in FIG. 8.

As shown in FIG. 1, FIG. 3, FIG. 4, FIG. 6, and FIG. 8, the first and second protruding surfaces 103 and 104 are respectively positioned in the first and second abutting portions 101 and 102, and protrude toward the flat surface 93 of the leg pieces 92 of the grommet 50. As shown in FIG. 8, the first and second protruding surfaces 103 and 104 are positioned approximately in the center in a width direction of the central leg 100, and protrude approximately in a semicircular shape of a cross-sectional surface. Also, the first and second protruding surfaces 103 and 104 extend in an up-and-down direction in FIG. 1, FIG. 3, FIG. 4, and FIG. 6 along a length direction of the central leg 100.

Although it is not shown in the figures, the first and second protruding surfaces 103 and 104 abut against the flat surface 93 of the leg piece 92 of the grommet 50, and both portions line-contact along the length direction of the leg portion 90.

Incidentally, as for the structure allowing the inner peripheral surface of the leg piece 92 of the grommet 50, and the outer peripheral surface of the insertion leg 60 of the pin 40 abutting against the inner peripheral surface to line-contact along the length direction of the leg portion 90, it is not limited to the first and second protruding surfaces 103 and 104.

(3) Locking Groove 105

Figure 10:
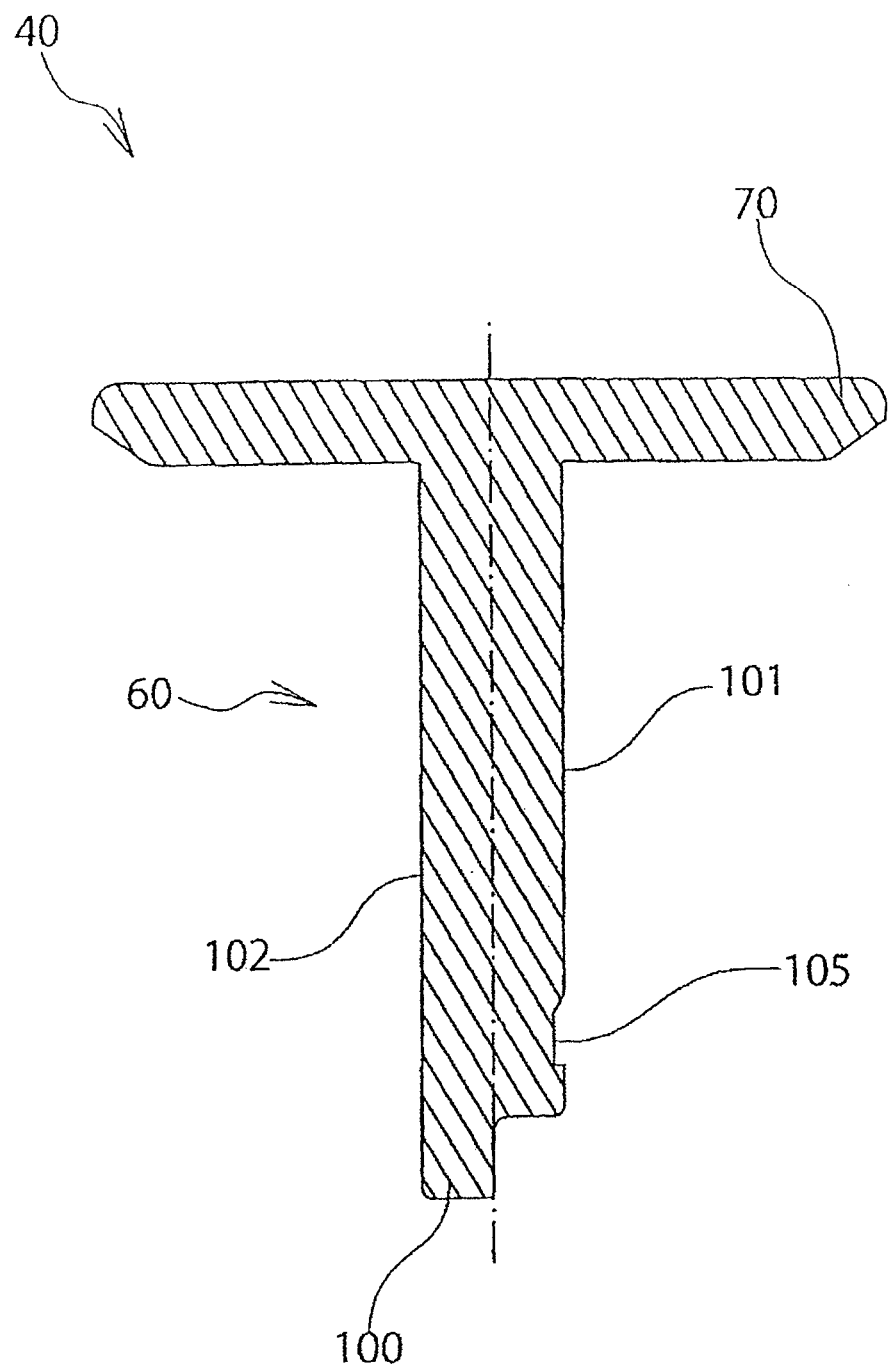
FIG. 10 is a cross-sectional view taken along a line D-D in FIG. 6.

As shown in FIG. 1, FIG. 2, FIG. 6, FIG. 7, and FIG. 10, the locking groove 105 is positioned on a lower end portion side of the central leg 100, and the locking claw 95 of the grommet 50 fits into the locking groove 105. As shown in FIG. 10, the locking groove 105 is concaved in a concave shape, and is structured by an inclined surface whose upper edge portion inclines downward toward a bottom; and a lower surface whose lower edge portion is approximately horizontal in the same figure.

(4) Slide Groove 106

As shown in FIG. 4, FIG. 5, FIG. 7, and FIG. 8, the slide groove 106 is formed in at least one end portion of both end portions in the width direction of the central leg 100, and the slide protrusion 52 of the grommet 50 fits into the slide groove 106. The slide groove 106 extends in a longitudinal direction of the central leg 100, i.e., the up-and-down direction in FIG. 4.

(5) Temporary Attaching Grooves 107

As shown in FIG. 1, FIG. 3, and FIG. 4, the temporary attaching grooves 107 are positioned on the lower end portion side of the central leg 100, and the temporary attaching protrusions 53 of the grommet 50 fit into the temporary attaching grooves 107. The temporary attaching grooves 107 are formed between the later-described central blade portion 111 and an end blade portion 115, and are concaved approximately in a U shape.

(Prevention Portion 110)

As shown in FIG. 1, FIGS. 3 to 6, FIG. 8, and FIG. 9, the prevention portion 110 is positioned in at least one of either the pin 40 or the grommet 50, for example, in the insertion leg 60 of the pin 40, and prevents a foreign matter such as gravel and the like from entering in.

Incidentally, although the prevention portion 110 is positioned in the pin 40, it is not limited to the above, and the prevention portion 110 may be positioned on a grommet 50 side, or positioned respectively in the pin 40 and the grommet 50.

Specifically, as shown in FIG. 1, FIGS. 3 to 6, FIG. 8, and FIG. 9, the prevention portion 110 includes the following respective portions.

Incidentally, each portion of the prevention portion 110 is not limited to the following (1) and (2), and the prevention portion 110 may be structured by either one of (1) or (2).

(1) Central Blade Portions 111 to 114

As shown in FIG. 1, FIGS. 3 to 6, FIG. 8, and FIG. 9, central blade portions 111 to 114 are positioned in a middle of a length of the central leg 100, and extend outwardly from the central leg 100 approximately in a blade shape.

The central blade portions 111 to 114 function as a wall portion of the prevention portion 110 provided to extend in the insertion leg 60 of the pin 40. Incidentally, as the wall portion, although the central blade portions 111 to 114 are illustrated as an example, the wall portion is not limited to the above.

Specifically, as shown in FIG. 8, the central blade portions 111 to 114 are provided at four corners of the first and second abutting portions 101 and 102 of the central leg 100 with a total of four pieces, and as a whole, the central blade portions 111 to 114 project approximately in an H shape of a cross-sectional surface.

Among the four central blade portions 111 to 114, a distance to an end surface positioned on an outside of the central blade portions 111 and 113, and 112 and 114, which face back-to-back by sandwiching the central leg 100, is set in a groove width of the slit 91 of the grommet 50 or above, for example, longer than the groove width. Also, among the four central blade portions 111 to 114, an interval between the central blade portions 111 and 112, and 113 and 114, which are opposed by sandwiching the first and second protruding surfaces 103 and 104, roughly corresponds to a side width of the leg piece 92 or above, for example, to the side width.

Incidentally, although four pieces are illustrated as an example of the number of the central blade portions 111 to 114, the number of the central blade portions 111 to 114 is not limited to the above, and may be the number of pieces that can block a release surface of the slit 91.

(2) End Blade Portions 115 to 118

As shown in FIG. 1, FIGS. 3 to 6, and FIG. 8, end blade portions 115 to 118 are positioned in an end portion of the central leg 100, and extend outwardly from the central leg 100 approximately in a blade shape.

Together with the central blade portions 111 to 114, the end blade portions 115 to 118 function as a wall portion of the prevention portion 110 provided to extend in the insertion leg 60 of the pin 40. Incidentally, as the wall portion, although the end blade portions 115 to 118 are illustrated as an example, the wall portion is not limited to the above.

As shown in FIG. 5, the end blade portions 115 to 118 are provided at four corners of the first and second abutting portions 101 and 102 of the central leg 100 with a total of four pieces, and as a whole, the end blade portions 115 to 118 project approximately in an H shape of a cross-sectional surface.

In the four end blade portions 115 to 118, a distance to an end surface positioned on an outside of the end blade portions 115 and 117, and 116 and 118, which face back-to-back by sandwiching the central leg 100, is set in the groove width of the slit 91 of the grommet 50 or above, for example, longer than the groove width. Also, among the four end blade portions 115 to 118, an interval between the end blade portions 115 and 116, and 117 and 118, which are opposed by sandwiching the first and second protruding surfaces 103 and 104, roughly corresponds to the side width of the leg piece 92 or above, for example, to the side width.

Incidentally, although four pieces are illustrated as an example of the number of the end blade portions 115 to 118, the number of the end blade portions 115 to 118 is not limited to the above, and may be the number of pieces that can block the release surface of the slit 91.

(Usage Method of Clip 10)

Next, a usage method of the clip 10 having the aforementioned structure will be explained.

First, as shown in FIGS. 16 to 19, the insertion leg 60 of the pin 40 is matched and inserted into the insertion hole 51 of the grommet 50 so as to be a temporary attached state.

Next, as shown in FIG. 2, using the clip 10 which is in the temporary attached state, the component 30 is attached relative to the base 20.

Incidentally, although the clip 10 is set in the temporary attached state, when the component 30 is attached, the grommet may be attached to the base 20 and the component 30 beforehand, and the pin 40 may be inserted at last.

First, as shown in FIG. 2, the base 20 and the component 30 are overlapped, and the attachment hole 21 and the through-hole 31 of both portions are matched.

Next, as shown in FIG. 2, the leg portion 90 of the grommet 50 which is in the temporary attached state is inserted toward the through-hole 31 of the component 30 from an attachment hole 21 side of the base 20.

Lastly, as shown in FIG. 2, by inserting the pin 40 into the insertion hole 51 of the grommet 50 deep, the leg portion 90 of the grommet 50 is spread at a back side of the component 30. By spreading the leg portion 90 of the grommet 50, the base 20 and the component 30 are sandwiched between the lower surface of the flange 80 in an overlapped state, and through the clip 10, the component 30 is fastened to the attachment hole 21 of the base 20.

In a fastened state of the clip 10, although it is not shown in the figures, the opposed release surface of the slit 91 of the grommet 50 is blocked from an outside by the prevention portion 110 of the pin 40, i.e., the four central blade portions 111 to 114, and the four end blade portions 115 to 118.

Consequently, by the prevention portion 110 of the pin 40, a foreign matter such as gravel, sand, mud, dust, and the like can be prevented from entering into a hollow interior portion of the leg portion 90 from the slit 91 of the grommet 50.

Namely, if a foreign matter such as a gravel, and the like enters between the pin and the grommet, a friction resistance between both portions increases, or a foreign matter such as a gravel and the like acts as a kind of a "wedge", so that there has been a possibility that the pin might be incapable of being pulled out. However, since the prevention portion 110 of the pin 40 can prevent a foreign matter such as gravel and the like from entering in, the aforementioned defect can be resolved.

On the other hand, when the fastened state of the clip 10 is released, although it is not shown in the figures, the driver and the like are inserted from the concave portions 82 of the grommet 50, and the head portion 70 of the pin 40 is raised from the bottom surface of the depressed portion 81, so that the insertion leg 60 of the pin 40 can slide in a direction of escaping from the insertion hole 51 of the grommet 50.

Second Embodiment

Next, using FIG. 20 and FIG. 21, a second embodiment of the present invention will be explained.

Figure 20:
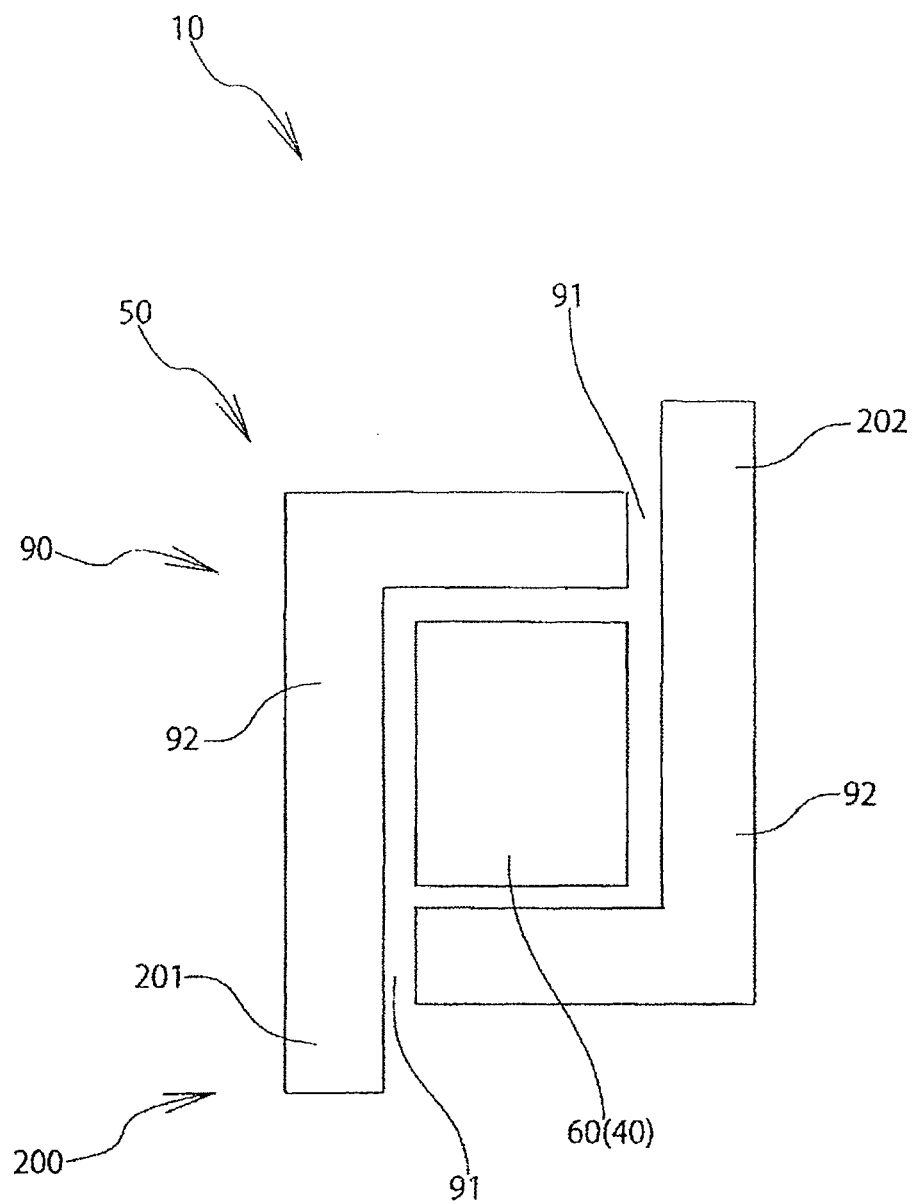
FIG. 20 shows a second embodiment of the present invention, and is an explanatory view of a prevention portion.
Figure 21:
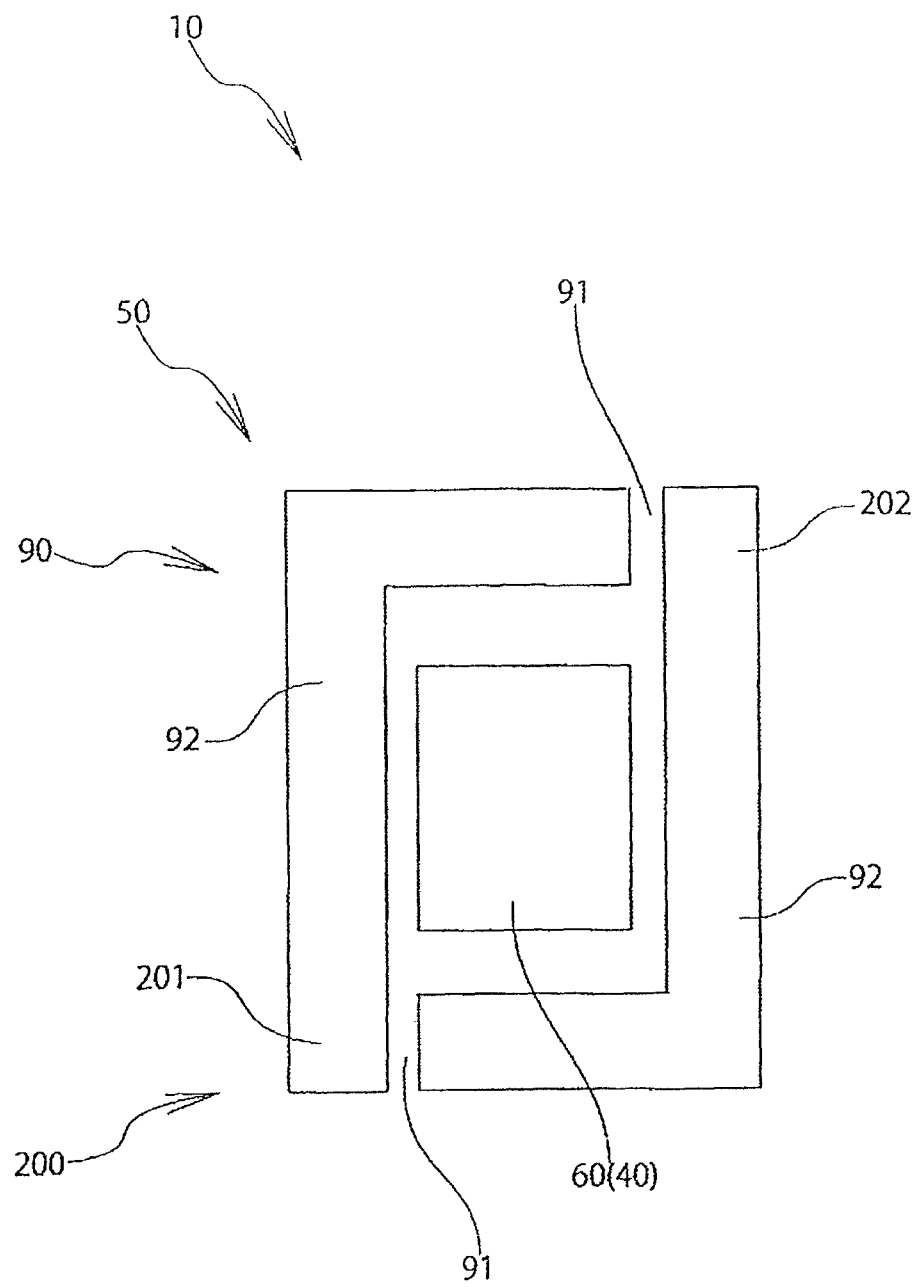
FIG. 21 corresponds to FIG. 20, and is an explanatory view of the prevention portion showing a state wherein a leg portion of the grommet is spread.

As shown in FIG. 20 and FIG. 21, a characteristic of the present embodiment is that a prevention portion 200 is positioned in one portion of the leg piece 92 of the grommet 50, and is provided to extend in a length direction of the slit 91.

Namely, using FIG. 20 and FIG. 21, by extending one portion of the leg piece 92 which has been split by the slit 91, there are formed extension portions 201 and 202.

As shown in FIG. 20, in the extension portions 201 and 202, end portions thereof protrude outwardly in a usual state of the leg portion 90. In a state wherein the insertion leg 60 of the pin 40 is inserted into the leg portion 90 deep, and the leg piece 92 is spread, both leg pieces 92 move along the extension portions 201 and 202 so as to be capable of preventing the slit 91 from broadening.

Namely, even at a time when the leg piece 92 is spread, the groove width of the slit 91 does not change, so that compared to a conventional grommet wherein the groove width of the slit expands, the present embodiment can reduce an entrance of a foreign matter such as a gravel and the like.

Incidentally, although the prevention portion 200 is structured by the extension portions 201 and 202, the prevention portion 200 is not limited to the above.

Third Embodiment

Next, although it is not shown in the figures, a third embodiment of the present invention will be explained.

A characteristic of the present embodiment is that the prevention portion is provided to extend along the length direction of the slit from the lower surface of the flange of the grommet.

In the present embodiment, the prevention portion can be formed on a flange side of the grommet.

All contents of the specification, claims, drawings, and abstract of Japanese Patent Application No. 2010-16856 filed on Jul. 27, 2010 are cited herein and are incorporated as a disclosure of the specification of the present invention.

What is claimed is:

1. A clip, comprising:
a pin including a central leg;
a grommet including an insertion hole to insert the pin, and a leg portion having a plurality of leg pieces and slits provided in a length direction of the leg portion to split the leg portion into the plurality of leg pieces, the plurality of leg pieces spreading outwardly by inserting the pin into the insertion hole; and
a prevention portion formed on the central leg, the prevention portion including central blade portions protruding axially outwardly from the central leg to have an H shape in a cross-section perpendicular to a length direction of the central leg and being arranged such that the central blade portions cover the slits between the plurality of leg pieces from outsides thereof,
wherein when the pin is fully inserted, the central blade portions are located outside the slits between the plurality of leg pieces and fully cover the slits to prevent a foreign matter from entering in the slits.

2. A clip according to claim 1, wherein each of the central blade portions is positioned at an outer side portion of the central leg of the pin, and extends along a length direction of each of the slits.

3. A clip according to claim 1, wherein each of the central blade portions is a wall portion which is provided at an outer side portion of the central leg and extends along the central leg of the pin.

4. A clip according to claim 1, wherein the central leg includes abutting portions respectively contacting with inner peripheral surfaces of the plurality of leg pieces of the grommet.

5. A clip according to claim 1, wherein inner peripheral surfaces of the plurality of leg pieces of the grommet and outer peripheral surfaces of the central leg of the pin abutting against the inner peripheral surfaces, are line-contacted along the length direction of the leg portion, respectively.

6. A clip according to claim 5, wherein each of the inner peripheral surfaces of the plurality of leg pieces of the grommet is a flat surface, and each of the outer peripheral surfaces of the central leg of the pin is a protruding surface protruding toward the flat surface.

7. A clip according to claim 1, wherein the pin includes abutting portions protruding outwardly from the central leg to contact inner peripheral surfaces of the plurality of leg pieces, and when the abutting portions contact the inner peripheral surfaces of the plurality of leg pieces, the central blade portions cover the slits from the outsides thereof.

8. A clip according to claim 7, wherein the central blade portions are arranged on two sides of each of the abutting portions, respectively.

9. A clip according to claim 8, wherein the prevention portion further includes end blade portions protruding circumferentially outwardly from the central leg to have an H shape with the central leg in the cross-section thereof and arranged on a portion axially deviated from the central blade portions.

10. A clip according to claim 9, wherein the central blade portions are positioned at a middle portion in the length direction of the central leg, and the end blade portions are positioned at an end portion in the length direction of the central leg.

11. A clip according to claim 10, wherein each of the plurality of leg pieces includes a locking claw projecting inwardly from an inner surface thereof and arranged on a lower end portion thereof, and the central leg includes a locking groove arranged on a lower portion thereof; and the locking claw fits into the locking groove at a portion between the central blade portions and between the end blade portions.

12. A clip, comprising:
a pin including an insertion leg having an abutting portion at one end thereof, and a blade portion protruding outwardly therefrom and arranged at an outside of the abutting portion; and
a grommet including an insertion hole to insert the pin, and a leg portion having a plurality of leg pieces and slits provided in a length direction of the leg portion to split the leg portion into the plurality of leg pieces, the slits being covered by the blade portion from outsides thereof, and inner peripheral surfaces of the plurality of leg pieces contacting the abutting portion to spread the plurality of leg pieces outwardly when inserting the pin into the insertion hole;
wherein the insertion leg has a thickness perpendicular to a width and an insertion direction of the insertion leg, and the blade portion has a width greater than the thickness of the insertion leg such that when the pin is fully inserted, the blade portion is located outside the slits between the plurality of leg pieces and fully covers the slits to prevent a foreign matter from entering in the slits.

13. A clip according to claim 12, wherein the blade portion includes a central blade portion protruding axially from a middle portion of the insertion leg and an end blade portion protruding axially from one end portion of the insertion leg.

14. A clip according to claim 13, wherein the central and end blade portions are formed on each side of the insertion leg.

15. A clip according to claim 1, wherein the central leg has a length, a width perpendicular to a direction of the length and a thickness perpendicular to the length and the width to form in a plate shape; and
the central blade portions are arranged on two outer portions of the central leg in the direction of the length of the central leg, and a width between the central blade portions, in a direction of the thickness of the central leg, is greater than that of each of the slits between the plurality of leg pieces to cover the slits from the outsides thereof.

16. A clip according to claim 15, wherein the central leg has two side portions in the direction of the width thereof, and abutting portions are respectively formed on the two side portions of the central leg;

the central blade portions include four blade portions, two blade portions being arranged on each of the two side portions of the central leg.

17. A clip according to claim 16, wherein the prevention portion further includes end blade portions having four blade portions, two blade portions protruding circumferentially outwardly from each of the two side portions of the central leg in the direction of the thickness thereof.

18. A clip according to claim 12, wherein the insertion leg has the width perpendicular to the direction of the thickness thereof to form in a plate shape; and the blade portion is arranged on two outer portions of the insertion leg in a direction of the length of the insertion leg, and has the width in the direction of the thickness of the insertion leg greater than that of each of the slits between the plurality of leg pieces to cover the outsides of the slits.

\* \* \* \* \*